Aug. 19, 1958 D. H. ROBBINS ET AL 2,848,049

JUSTIFICATION INFORMATION COMPUTER AND TAPE PERFORATOR FOR PHOTOCOMPOSING MACHINES

Filed Sept. 4, 1956 20 Sheets-Sheet 1

INVENTORS
DANIEL H. ROBBINS
VICTOR M. CORRADO

BY Morrison, Kennedy & Campbell
ATTORNEYS

INVENTORS
DANIEL H. ROBBINS
VICTOR M. CORRADO
BY
Morrison, Kennedy & Campbell
ATTORNEYS Aug. 19, 1958 D. H. ROBBINS ET AL 2,848,049

JUSTIFICATION INFORMATION COMPUTER AND TAPE PERFORATOR FOR PHOTOCOMPOSING MACHINES

Filed Sept. 4, 1956 20 Sheets-Sheet 3

INVENTORS
DANIEL H. ROBBINS
VICTOR M. CORRADO

BY

Morrison, Kennedy & Campbell

ATTORNEYS

INVENTORS
DANIEL H. ROBBINS
VICTOR M. CORRADO
BY Morrison, Kennedy & Campbell
ATTORNEYS INVENTORS
DANIEL H. ROBBINS
VICTOR M. CORRADO
BY
Morrison, Kennedy & Campbell
ATTORNEYS INVENTORS
DANIEL H. ROBBINS
VICTOR M. CORRADO
BY
Morrison, Kennedy & Campbell
ATTORNEYS INVENTORS
DANIEL H. ROBBINS
VICTOR M. CORRADO
BY
Morrison, Kennedy & Campbell
ATTORNEYS INVENTORS
DANIEL H. ROBBINS
VICTOR M. CORRADO
BY
Morrison, Kennedy & Campbell
ATTORNEYS

JUSTIFICATION PORTION OF COMPUTER DRUM

INVENTORS
DANIEL H. ROBBINS
VICTOR M. CORRADO
BY
Morrison, Kennedy & Campbell
ATTORNEYS JUSTIFICATION INFORMATION COMPUTER AND TAPE PERFORATOR FOR PHOTOCOMPOSING MACHINES Filed Sept. 4, 1956

LINE REMAINDER PORTION OF COMPUTER DRUM

INVENTORS
DANIEL H. ROBBINS
VICTOR M. CORRADO
Morrison, Kennedy & Campbell
ATTORNEYS INVENTORS
DANIEL H. ROBBINS
VICTOR M. CORRADO
Morrison, Kennedy & Campbell
ATTORNEYS INVENTORS
DANIEL H. ROBBINS
VICTOR M. CORRADO
BY
Morison, Kennedy & Campbell
ATTORNEYS Aug. 19, 1958 D. H. ROBBINS ET AL 2,848,049
JUSTIFICATION INFORMATION COMPUTER AND TAPE PERFORATOR
FOR PHOTOCOMPOSING MACHINES
Filed Sept. 4, 1956 20 Sheets-Sheet 13

INVENTORS
DANIEL H. ROBBINS
BY VICTOR M. CORRADO
Morrison, Kennedy & Campbell
ATTORNEYS INVENTORS
DANIEL H. ROBBINS
VICTOR M. CORRADO
BY
Morrison, Kennedy & Campbell
ATTORNEYS INVENTORS
DANIEL H. ROBBINS
VICTOR M. CORRADO
BY
Morrison, Kennedy & Campbell
ATTORNEYS INVENTORS
DANIEL H. ROBBINS
VICTOR M. CORRADO
BY
Morrison, Kennedy & Campbell
ATTORNEYS INVENTORS
DANIEL H. ROBBINS
VICTOR M. CORRADO
BY
Harrison, Kennedy & Campbell
ATTORNEYS INVENTORS
DANIEL H. ROBBINS
VICTOR M. CORRADO
BY
Howson, Kennedy Campbell
ATTORNEYS INVENTORS
DANIEL H. ROBBINS
VICTOR M. CORRADO
BY
Morrison, Kennedy & Campbell
ATTORNEYS INVENTORS
DANIEL H. ROBBINS
VICTOR M. CORRADO
BY
Morrison, Kennedy & Campbell
ATTORNEYS United States Patent Office 2,848,049

Patented Aug. 19, 1958

2,848,049

JUSTIFICATION INFORMATION COMPUTER AND TAPE PERFORATOR FOR PHOTOCOMPOSING MACHINES

Daniel H. Robbins, Bronxville, and Victor M. Corrado, Williston Park, N. Y., assignors to Mergenthaler Linotype Company, a corporation of New York Application September 4, 1956, Serial No. 607,952

63 Claims. (Cl. 164—113)

This invention relates to a keyboard or composing unit for preparing a control tape to be used in the photographic unit of a two-unit typographical photocomposing machine.

More specifically, the invention relates to an apparatus, and the actuating means therefor, whereby justifications, quadding or centering information is computed for a keyboarded line of text material and then coded on a control tape adjacent the representations of the individual characters of the line to be composed, the tape to be used in the photographic unit of the photocomposing machine to control composition of the text material as a justified, quadded or centered line depending on the information coded on the tape.

In a two-unit photocomposing machine as herein contemplated (for the general organization of which see copending applications Serial No. 422,526, filed April 12, 1954, now Patent No. 2,816,609, and Serial No. 419,012, filed March 26, 1954), operation of the composing unit keyboard, as by actuation of the character keys, produces character identification signals as well as character width signals which are transmitted direct to a tape coding unit, such as a perforator, where the signals are coded on the tape. Actuation of a space key or space bar similarly results in the transmission of a space signal to the coding unit. The character width signals and the space signal, in addition, are transmitted to the justification, quadding and centering computer where the information is appropriately stored so that when the end of the line is reached and the machine operator depresses an end-of-line key, such as the justification or quadding or centering key, a justification, quadding or centering signal is coded on the tape following the succession of character signals for the same line. The tape so produced can thereupon be used to control the operation of the photographic unit to provide a photographically composed record of the text material keyboarded in the composing unit. The photographic unit includes a photographic font of type characters and a shutter mechanism which, in response to a tape character signal, exposes the character represented thereby for photographic action. The time of photography is controlled responsive to the width portion of the character signal or the justification, quadding or centering signal so that the line of text material is justified, quadded or centered depending on the end of line operation called for by the composing unit operator.

Each of the characters of the font has a definite set width measured in units of a typographical em. Of course, for typographical refinement, the set widths vary from character to character, but the widths are based on an 18-unit system. That is the em is 18 units wide and all characters have a width of a predetermined number of units. Therefore, if one was to add up the widths of all the characters in a line, a definite number of units would be arrived at indicative of the space in the line actually occupied by the characters. At the same time, the length of the line in which the characters are to appear is known and this also is given a value in units. Thus, if a justified line is to be 40 ems in length, such line can be considered to contain 40×18 or 720 units. The number of units in a predetermined line length will always exceed the number of units allocated for interword spaces. For example, a normal interword space may be 4 units. Even considering the units taken by a normal word space, the units taken by the characters and the word spaces do not generally equal the number of units in the line, but, rather, total a lesser number. The difference between the units of a predetermined line length and the units of a line of characters plus interword spaces is termed the line remainder. The number of units in the line remainder must be apportioned among the interword spaces if the line is to be justified to its predetermined length. On the other hand, the line may be photographed flush left, or quad left, that is the first character coinciding with the left-hand margin, as in the last line of a printed paragraph. In this case, the interword spaces are of normal width and the line remainder is the blank space to right of the line. As another condition, the line may be photographed flush right, or quad right, with the last character in the line coinciding with the right-hand margin. Again, in this case, the interword spaces are of normal width and the line remainder is the blank space to the left of the line. The last condition is when the line is to be centered, or photographed midway between the left-hand and right-hand margins, again with normal interword spaces. Here the line remainder is divided into two parts corresponding to the white space to the left and to the right of the centered line. It is to the coding of signals appropriate to the foregoing situations that the present invention is primarily concerned, although other refinements and improvements of the apparatus disclosed in application Serial No. 422,526 are also presented.

That portion of the input unit which codes the tape, i. e. the perforator itself, will not be described since that one which is disclosed in aforementioned application Serial No. 422,526 will be satisfactory, as will any commercially available perforator if modified to comprise the desired number of punching stations.

In its preferred form, the present apparatus comprises an electric typewriter carrying the character keys normally used in composing copy and an auxiliary keyboard carrying keys for controlling machine functions, such as selecting the typographical font to be used in the photographic unit (this unit having a plurality of fonts, from any selected one of which characters can be photographed), and for controlling point size of the character images recorded on film, as well as auxiliary keys, such as the justification, quadding and centering keys, for causing the information in the computer apparatus to be coded on the control tape. Electrical switches operated by the key levers of the typewriter and the auxiliary keyboard control circuitry which in turn operates the tape coding unit and the computer mechanism.

In general terms, the key operated switch which is closed upon depression of a character key completes a plurality of circuits which may be grouped according to the function performed and, as such, defined. A first group of circuits completed will include diode coding circuits which identify the characters in binary form. The binary circuits in turn, through the intermediary of electronic circuitry and tubes, lead to the tape coding device or, in the present case, to punch operating solenoids of a tape perforator. The solenoids will be selectively operated according to the character key depressed and the perforator will therefore code the control tape in a manner corresponding thereto. Such coded representations will be read or decoded in the second or photographic unit of the photocomposing machine to control the operation of so-called binary shutters in the manner disclosed in aforementioned application Serial No. 419,012.

A second group of circuits energized by depression of a character key will be those which deal with character width information. In the first instance, the circuit will proceed selectively to a decimal coder which represents the width of the character for the key depressed. More specifically, the decimal coder will include a plurality of coding groups, only one group of which will be in operation at one time. Each group represents the width information for the characters of a particular type font, so only that group will be used which corresponds with the character font to be used in the photographic unit for the particular text matter being composed. Selection of the coding group is under the control of the operator. From the decimal coder, the circuit is traced to the unit adding and subtracting circuit where the width value of a character can be modified for reasons of typographical refinement, such as kerning or letter spacing. The circuit thereafter proceeds to the width coder which converts the width information from decimal to binary form. The width coder is a diode coding circuit similar to that provided in the character identification group of circuits. After conversion to binary form, the width information follows two paths, one to the tape coding device whereby it is coded onto the tape adjacent the character identification signal in a manner similar to that of the character identification information. The second path followed by the binary width information is to the computing device wherein the widths of the characters and spaces making up the line of composition are totaled so that upon completion of the line, information as to justification, quadding or centering can be obtained as desired.

The computing device itself will include a computer drum and a line length indicator which are pre-set, before composition is begun, to correspond with the desired predetermined length of a justified line, such setting being made in ems and units-of-an-em. As the operator composes the line of text, the indicator and the computer drum continuously subtract, from the pre-set line length in units, the unit count of the characters and normal word spaces entering into the composed line. Therefore, the line length indicator and the computer drum give a running count of the line remainder. When this remainder falls within a predetermined count from the end of the line (generally 4 ems or in an 18 unit system 72 units), the operator receives a justification signal which simply indicates that he may stop composing the line, depress the justification key and obtain justification information from the computer drum which is thereupon transmitted to the perforator and coded on the tape following the succession of character signals for the line to which the justification signal is applicable. Of course, if the line is to be quadded or centered (and therefore not justified), it is not necessary for the operator to receive the signal before a quad or center key on the auxiliary keyboard is depressed. In the latter cases, line remainder information is transmitted to the perforator and coded on the tape.

The control tape thus will comprise, generally, a succession of dual signals representing the characters to be photographed in a line, each signal having what might be considered two parts, namely, a character identification part (which could properly to regarded as an individual signal) and a character width part (which could also properly be regarded as a separate individual signal) and a justification or quad or center signal. The latter signal is read or decoded in the photographic unit to control the composition of the line. Each line to be composed will contain the foregoing signals and the entire control tape will comprise groups of such signals. Other signals may appear in the tape, either to control movement of the tape through the photographic unit tape or to control the performance of the photographic unit as, for example, to control the point size and leading of the photographed copy.

Having thus briefly outlined the operation of the composing or keyboard unit, attention is directed to the drawings and specification wherein is shown and described a preferred arrangement for effecting the desired results.

Figures 1, 1A:
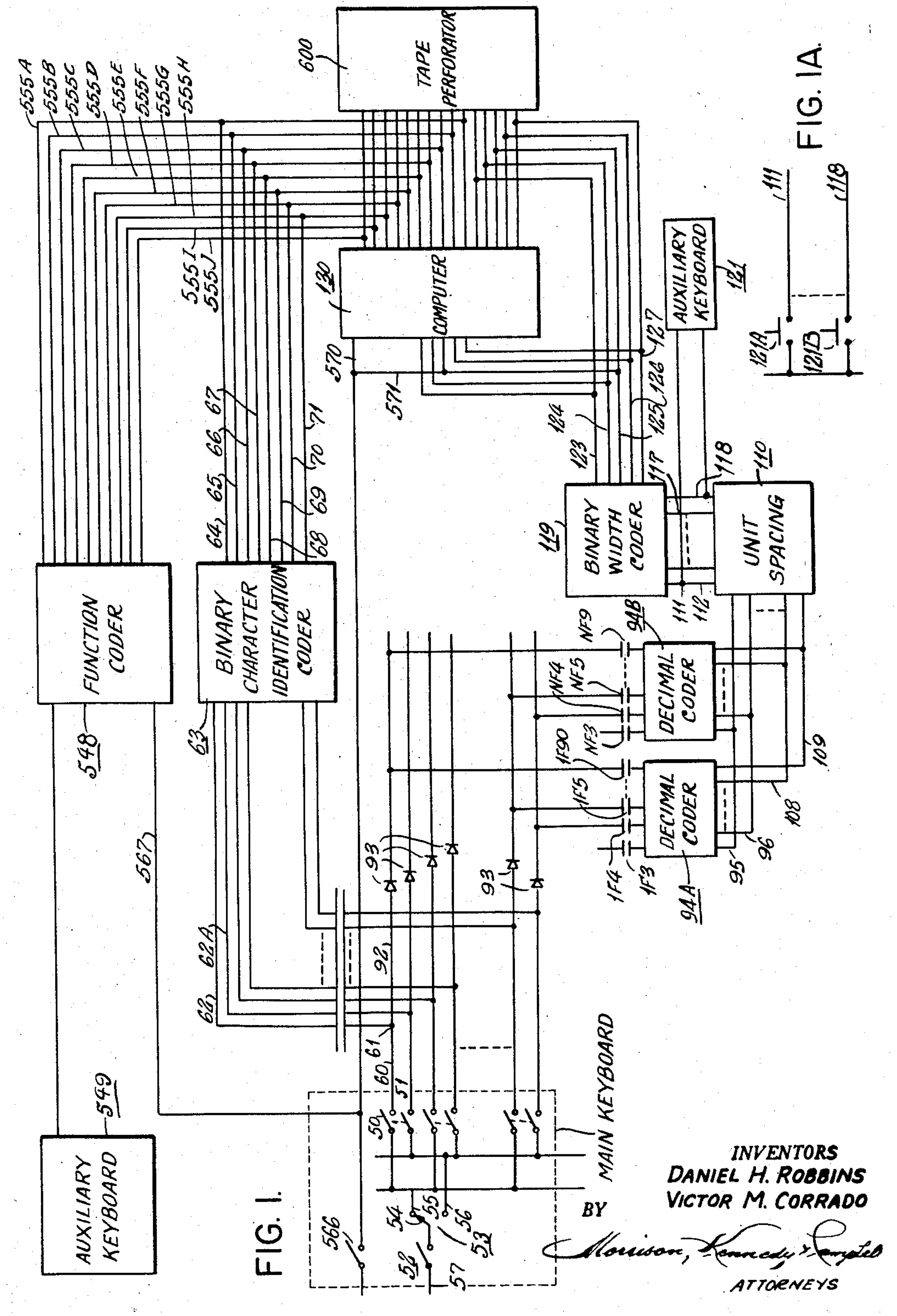
Fig. 1 is a schematic circuit diagram in block form showing the signal circuitry of the keyboard unit.
Fig. 1A is a schematic circuit diagram showing the push buttons for coding width information.

For purposes of simplification, the entire circuit for the apparatus is not shown, but only representative portions thereof are disclosed to illustrate the principle of operation of the various circuits, it being understood, of course, that in all instances the omitted circuits are similar to those shown. However, in Fig. 1, there is shown a schematic circuit diagram of the signal circuitry which is brought into operation when a character key is depressed.

Upon depression of a character key of the typewriter or composing keyboard, the key lever will close the contacts of a pair of switches 50 and 51, a similar pair of switches being associated with each character key of the keyboard. Similarly closed are the contacts of universal switch 52, which contacts are closed whenever any character key is depressed. Depending on whether the shift key is in shift or unshift position, single-pole, double-throw switch 53 will be actuated so that common contact 54 engages shift contact 55 or unshift contact 56 respectively. If a keyboard is used having separate keys for the shift and unshift characters, that is, the upper case and lower case characters as in the typewriter, switch 53 can be eliminated and the circuits to be described traced directly. The provision of switch 53 stems from the fact that in a typewriter a single character key operates switch contacts for two different characters, these generally being the upper and lower case representations of a letter but in some instances totally different characters.

If it is assumed that the character key for actuating switches 50 and 51 is depressed, and that the shift key is in shift position, a circuit can be traced from common line 57, through contacts of universal switch 52, and the contact for the particular character selected, to conductor 60. There will in fact be as many conductors 60 as there are characters to be accommodated in in the apparatus. However, a description of the circuitry for a single conductor, or in other words for a single character, will suffice for an understanding of the invention.

Figure 2:
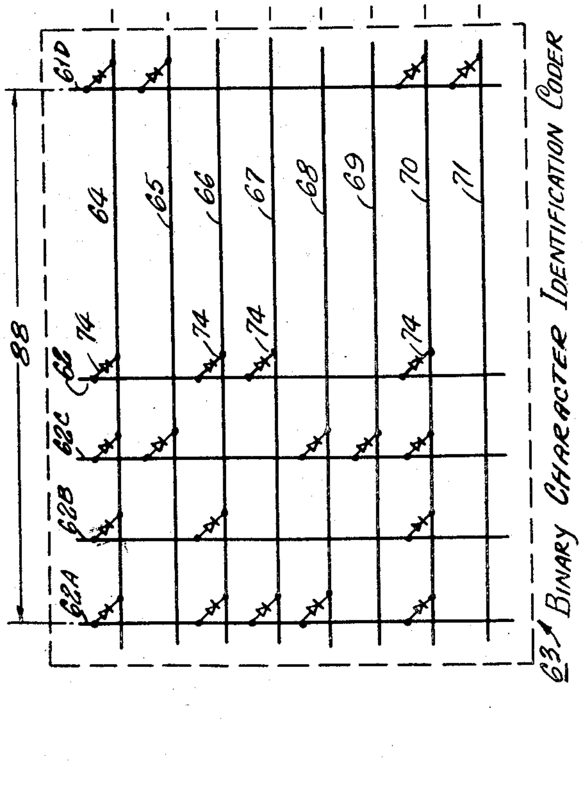
Fig. 2 is a schematic representation of the character identification coder diode circuit.

Conductor 60 at junction 61 divides into two parallel circuits, one for identification of the character associated with the depressed key, and the other for recording its width. Consideration will first be given to the identification circuits. Conductor 62 is connected to the character diode coder 63 which is more specifically detailed in Fig. 2 to which attention is now directed.

The diode coder is simply a circuit network wherein the signal representing the selected character is transformed to binary form, the reason for such transformation being that the binary signals are decoded in the photographic unit of the photocomposing machine and control the operation of binary shutters in the manner disclosed in copending application Serial No. 419,012. In the coder, the "binary" wires are designated 64, 65, 66, 67, 68, 69, 70 and 71 and represent the binary values 1, 2, 4, 8, 16, 32, 64 and 128, respectively.

The circuit which was completed, as by depression of a character key, enters the diode coder by conductor 62 and will be assumed to have assigned thereto the value seventy-seven (77) and, therefore, to consist of the binary numbers 1, 4, 8 and 64. The significance of such value is that in the photographic unit, binary shutters having the values 1, 4, 8 and 64 will be operated and the character in position 77 (see Fig. 9 of copending application Serial No. 419,012) will be exposed for photographing, it corresponding to the finger key depressed in the keyboard unit.

In connecting conductor 62 to binary wires 64, 66, 67 and 70, the connection is made through a device for limiting the reverse flow of electricity, such as selenium rectifiers 74. The connection from each of the conductors leading from the key lever actuated switches of the keyboard unit to the binary wires of the character diode coder is similarly made through rectifier devices. It is understood, of course, that each such connection will be unique in that the conductor 62, 62A, 62B, etc., associated with each character will be connected to a unique combination of binary wires.

Figure 48:
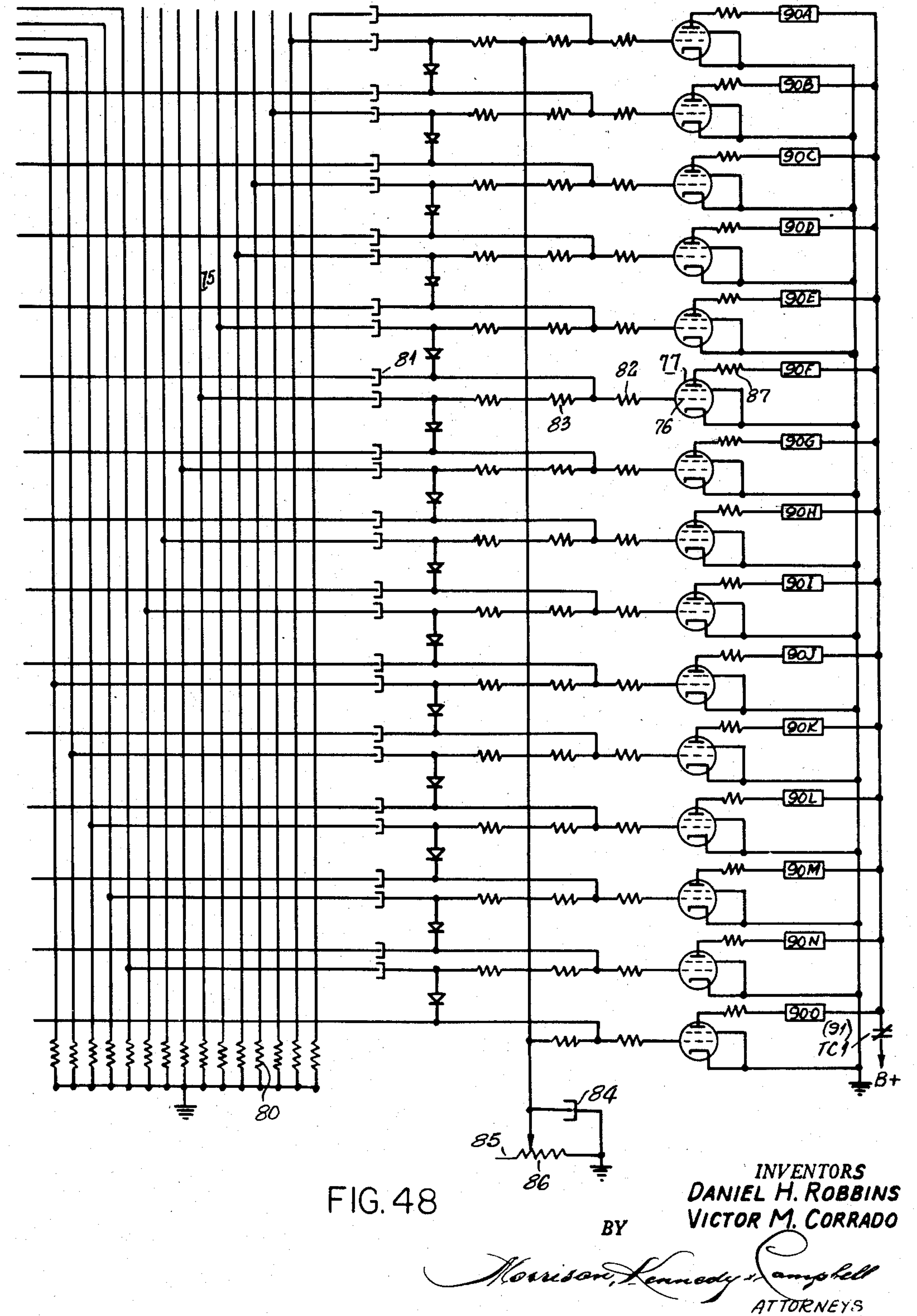
Fig. 48 is a schematic diagram of the perforator solenoid control circuits.

The eight binary wires, in turn, lead to the control circuits for the perforator. Since each of the wires leads to an identical circuit, it will suffice to show and describe only a single representative circuit. This will be done by reference to Fig. 6 but see also Fig. 48 which is a complete diagram of the perforator solenoid control circuits, the solenoids being designated 90A to 90–O. A binary wire is directly connected to lead 75. Hence when the binary wire has a voltage impressed thereon, as by depressing an associated character key, such voltage is impressed on lead 75 to give a positive pulse to the grid 76 of electron tube 77. The tube circuitry includes grid resistor 80, across which the voltage pulse appears, and coupling or isolating capacitor 81 which isolates it from steady state voltages of preceding circuitry. After passing capacitor 81, the pulse traverses grid leak resistor 82 to grid 76. Completing the grid circuit is resistor 83 and by-pass capacitor 84. A negative voltage source biases the grid negative and the particular bias voltage can be adjusted by means of bias potentiometer 86.

The plate circuit of the tube includes plate resistor 87 and perforator interponent solenoid 90. Normally engaged contacts 91 complete the circuit to the B+ power supply. The tube is normally non-conducting and hence solenoid 90 is deenergized. If binary wire 64 is energized, however, as by depression of an appropriate character key, a voltage pulse is fed to the grid circuit to trigger the tube and cause it to begin conducting, thereupon energizing solenoid 90. Energization of the solenoid results in a code signal being impressed on the tape in perforator 600 (Fig. 1). When it is no longer desired to maintain solenoid 90 energized, contacts 91 are separated to disconnect the tube from the B+ power supply, thus causing the tube to cease firing and solenoid 90 to be deenergized.

Figure 6:
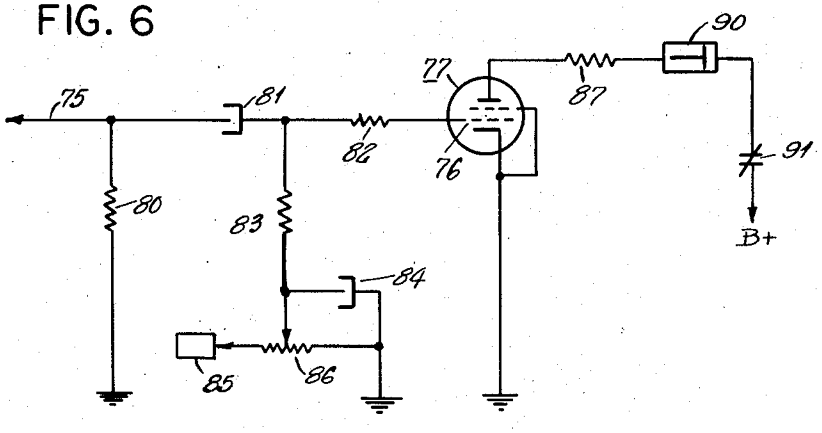
Fig. 6 is a schematic representation of an electron tube circuit used in the present invention.

It will be repeated, for purposes of clarity, that each of the eight binary wires leads to an electron tube circuit as shown in Fig. 6. Thus, any combination of solenoids 90 will be energized depending on the binary wires connected to the character conductor 62, and a code signal representing that character will be impressed on the tape in a manner similar to that described in application Serial No. 422,526. In that case, interponent solenoids are also provided which when energized result in perforation of the coded tape.

Attention will now be directed to the width information coding circuits. Referring again to Fig. 1, depression of a character key resulted in the completion of a circuit to conductor 60, which divided into the conductor 62, leading to the character identification circuits above considered, and conductor 92 which leads to the character width circuits now to be considered.

Conductor 92 immediately leads to a reverse current limiting device or rectifier 93 and thereafter to the decimal coder 94A through front selector contacts 1F3, 1F4, etc. It will be noted that a plurality of decimal coders are provided in the present apparatus, only one of which will be in use at any one time. The purpose of this arrangement is to permit the mixing of type face styles to be accomplished with facility and without the physical modification of the apparatus, as heretofore. In considering alphabetical fonts, the set width of a particular character, e. g. the lower case "a," may differ from one type face style to another and consequently when it is desired to code the width information for the character "a" as when the "a" key is depressed, the width thereof which is coded will be dependent on the font which is selected for photographing.

The provision of electric coding means renders it possible to accommodate width information for a wide variety of fonts conveniently. For example, in prototype models of the present apparatus, as many as eighteen separate width coding devices have been provided. Contacts on font selector relays are furnished to select which of the coding devices will be operatively connected to the key lever contacts at one time.

Figure 3:
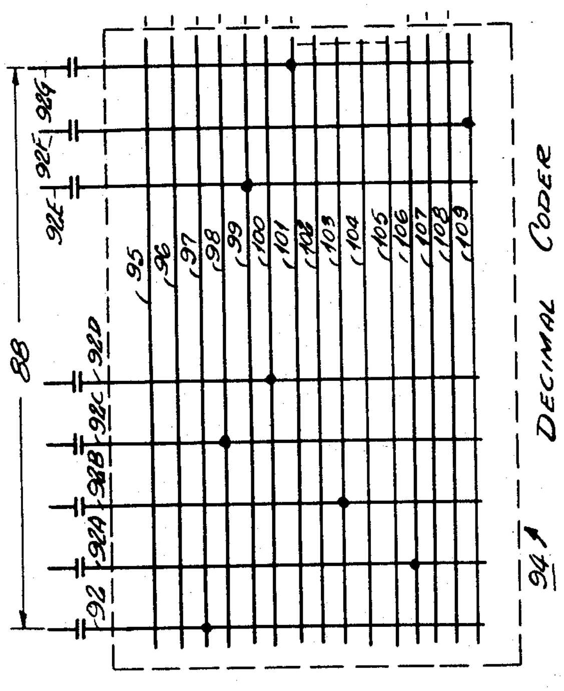
Fig. 3 is a schematic representation of the character width decimal coder.

Referring to Fig. 3, the decimal width coder is seen to be simply a grid network having fifteen output wires 95, 96, 97 . . . 109, having assigned thereto the decimal values 4, 5, 6 . . . 18 inclusive, respectively. Traversing these fifteen output wires are the conductors 92, 92A, 92B, etc. (88 in total, assuming a 44 key character keyboard) from the key lever operated switches. Each of these conductors will be connected to a single output wire, the particular one depending on the width of the character associated with the depressed key. Thus if a key is depressed for a character having a set width of eighteen units, the conductor 92F from such key will be connected to the output wire 109 having an assigned value of eighteen. As another example, if the key depressed is for a character having a set width of twelve units, the conductor 92B from such key will be connected to the output wire 103 having an assigned value of twelve.

It is clear that if one font selector switch is deenergized to separate contacts 1F3, 1F4, etc. and a second font selector switch is energized to engage contacts 2F3, 2F4, etc., then a second width decimal coder unit will be operatively connected to conductors 92, 92A, etc., and the conductor, e. g. 92B (which in the first coder may have been connected to an output wire having a value of twelve) may, in the second coder, be connected to an output wire having a value of eleven.

Figure 5:
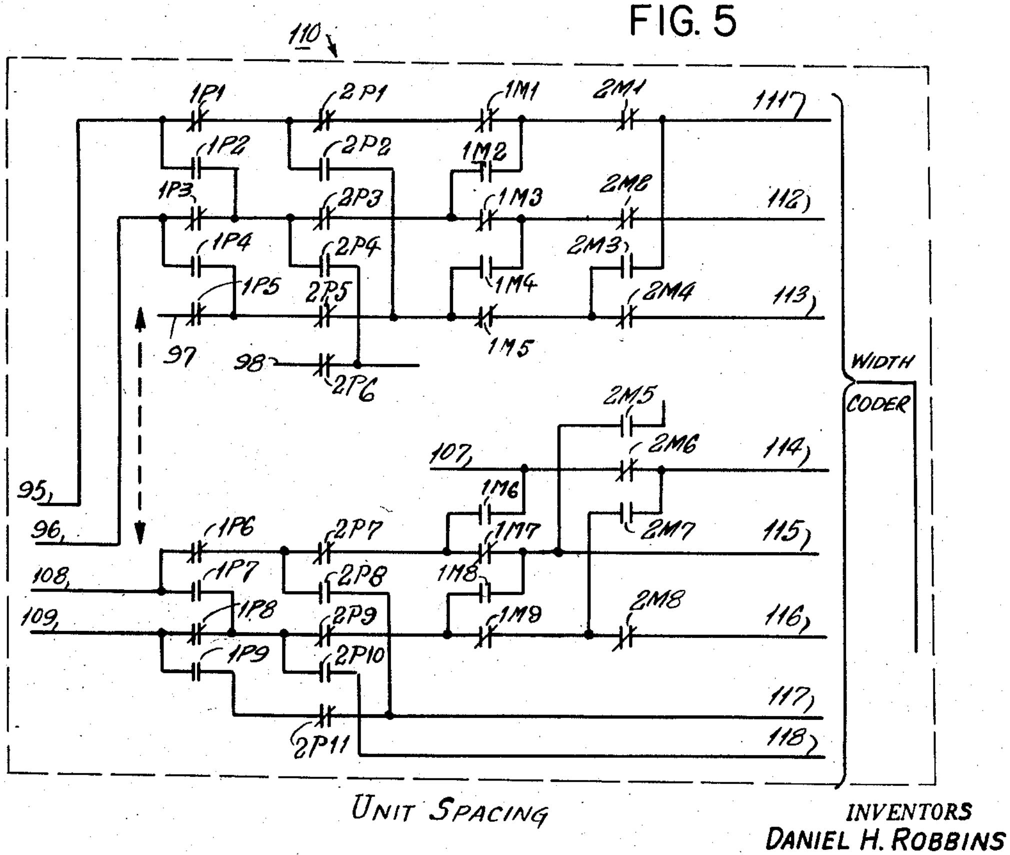
Fig. 5 is a schematic representation of the unit spacing circuit.

The fifteen output wires emanating from the decimal coder units then lead to the unit spacing circuitry 110 shown in block form in Fig. 1, but more specifically detailed in Fig. 5. By means of this circuit it is possible to obtain certain typographical refinements, such as kerning, wherein the descender of one letter, e. g. lower case "j," underlies a preceding letter, such as the lower case "n" in "injure," or to increase the normal intercharacter spacing when such may be necessary to fill out a line. The circuit for accomplishing this result is shown as a switching circuit which connects an output wire from the decimal coder to an adjoining wire 111 to 118 having a value of one or two units greater than the original output wire or a value one, two, or three units less than the value of the output unit. Thus, if a character having a set width of six units is to be coded, the conductor 92 leading to the decimal coder will be connected to the output wire 97 thereof having the value six. Now if that character is to be kerned with respect to the preceding character in the photographic unit to the extent that it will be two units closer to the preceding character than when not kerned, the minus two unit button will be depressed to energize a switch and engage contacts 2M3. It is thus seen that the circuit will be traced from the decimal coder output wire 97, having the value six, through contacts 2M3 to the unit spacing circuit output wire 111 having the value four. In a similar manner one, two or three units can be subtracted from any width value but, in no event, can the apparatus accommodate final width values of less than four units. Thus, one would not subtract one unit from a character having a set width of four units since in such a case the end result would be to code the character as if it were a three unit character.

To increase the normal intercharacter spacing as might be desired in certain types of composition, the operator simply depresses the plus unit spacing button, e. g. the plus-one unit spacing button, to engage contacts 1P7. Therefore, if a character having a set width of seventeen units is to be letter-spaced from a preceding character, the width information for the letter-spaced character will leave the decimal coder on the output wire 108 having the value seventeen and then through contacts 1P7 to the unit space circuit output wire 116 having the value eighteen. It will be noted that the circuit for the unit spacing circuit output wire having the value seventeen is interrupted by the separation of normally engaged contacts 1P6, these contacts separating upon actuation of the plus-one unit spacing button.

Figure 4:
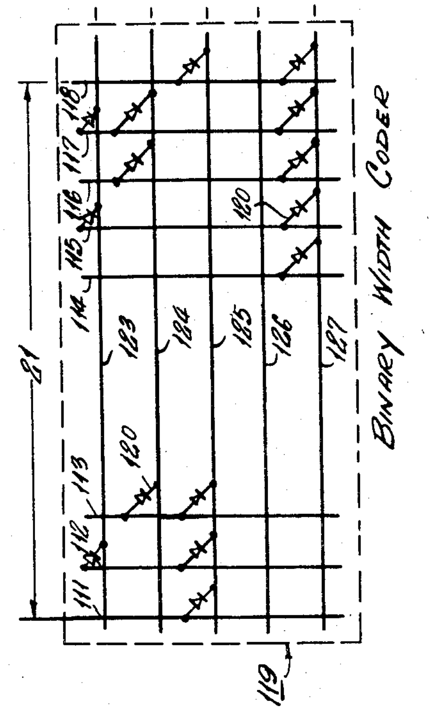
Fig. 4 is a schematic representation of the binary character width diode coder.

From the unit spacing circuit, the width information is transformed from decimal form to binary form in the width binary coder circuit shown in Fig. 4. This circuit is similar to the character identification binary coder circuit except that the input leads (the output wires of the unit spacing circuit 110) number eighteen for widths of from four to twenty-one units, inclusive, as contrasted to the eighty-eight character input leads, and the output leads 123, 124, 125, 126 and 127 number five since a binary code having maximum value of twenty-one only is used, although with five outputs a maximum binary value of thirty-one can be obtained.

By way of example, if we consider the decimal code of seventeen units, we will see that the unit space circuit output wire 115 having a value seventeen will be connected to the binary coder output wires 127 and 123 having the value sixteen and one respectively, the connection being made through rectifiers 120 to prevent "sneak" circuits. Other typical circuits are shown, but it is believed that these do not require any elaboration.

Each of the five output wires of the width binary coder terminates in an electron tube circuit similar to that shown in Fig. 6, the operation of which was previously explained. Thus five interponent solenoids are provided in the perforator to control the coding of the width information. The interponent solenoid circuits into which the width binary coder output wires terminate are distinct from those provided for the character identification coder so that the character width information or signal can be coded on the control tape adjacent the character identification information or signal, thus permitting a dual character identification and character width signal, as previously mentioned.

In addition to the means described for transmitting character width information through the various circuit elements to the unit spacing circuit 110 and the width binary coder 119, it is also contemplated that width information alone be fed into the apparatus and be coded devoid of any character identification information. This is particularly desirable when indentations are to be provided in the photographed copy produced in the photographic unit. In such cases, width information will be coded on the tape which when read in the photographic unit will provide blank spaces in the photographic copy corresponding to the coded width. Such information may be coded as a single signal or as a series of successive signals. In the latter case, the blank space in the photographic copy will correspond to the sum of the individual width signals.

There is a further advantage derived from the ability to code width information alone in that if, in a line of composition which is to be justified, the number of interword spaces exceeds the number which can be accommodated in the justification computing apparatus, the excess number of word spaces can be coded as width signals rather than as word space signals.

To code such lone width information in the perforator 600, the operator will simply depress one of a group of push buttons located on the width information keyboard 121 (Fig. 1), each of which will be connected to one of the output wires 111 to 118 of the unit spacing circuit 110. For example, the push button 121A (Fig. 1A) will represent the width value four and will be connected to output wire 111. As a further example, push button 121B will represent the width value eighteen and will be connected to output wire 118. Of course, a push button can be provided for connection to each wires 111 to 118, but in practice a limited number of push buttons will be provided for coding the more representative width values.

It has so far been demonstrated that by depressing a character key, information regarding the character associated with the key will be coded on the control tape. Such information is coded at thirteen stations, or in the case of the preferred perforator, at thirteen punch locations, eight of which are devoted to coding the character identification while five are assigned the function of coding character width.

As a composition of a line of text proceeds, information for each character in the line is coded on the control tape as indicated above, as is a signal for each interword space in the line. In addition to the information regarding each character, however, it will be necessary for the control tape to include information as to how the line is to be photographed. That is, should the line be quadded left, quadded right, centered or justified? Also the tape must contain information to permit the carrying out of the desired composing operation. For example, if the line is to be justified, information is provided which when decoded in the photographic unit will control the interword spacing to justify the line. If the line is to be quadded left, the control tape is coded so that normal interword spacing is effected during the photographing of the line in the photographic unit. If the line is to be quadded right, information is provided on the tape which will allow the photographic unit to traverse a portion of the film before photography of the line takes place, to assure that after providing the proper amount of white space preceding the line, the last character of the line will coincide with the right-hand margin. On the other hand, if the line is to be centered, information to control photography of the line so that the white space between the left-hand margin and the first character equals, or approximately equals, the white space between the terminal character and the right-hand margin. The requisite information is received from the computing device which will be considered hereinafter.

However, before describing the particular mechanism, it is believed worth while to review the fundamentals of the unit system for character widths. In such a system, the typographical "em" is divided into a discrete number of units, for example, eighteen units as in the present apparatus, and each unit will be one-eighteenth of an em in width. The characters will be assigned widths measured in such units. Thus, the character upper case "A" may have a width of nine units, while the lower case "i" may have a width of four units (the narrowest width of any character) and the upper case "W" may have a width of eighteen units (the maximum width of a character). Of course, the width of a particular character may vary from one type face style to another as previously pointed out, but in any event, the width will still be based on the same unit system. By subdividing the em into a greater number of units, a greater range for differentiating between character widths can be obtained, but experience has shown that an eighteen unit system gives satisfactory typographical results. Even the normal interword space is assigned a width measured in units of an em. For ordinary composition, the interword space is taken as four units. It will be seen later that this value is used only to measure the unjustified length of a line and does not indicate the interword spacing in a justified line, which will be greater than the "normal" value by an amount equal to the line remainder in units divided by the number of interword spaces. Of course in a quadded or centered line, the width of an interword space will equal the normal value of four. However, as a typographical nicety, the "normal" interword space value may be varied under control of the operator and under such conditions may assume a value of six, eight or any other selected number of units. Such selection may be desirable if a line preceding a quadded line has been justified under conditions which rendered the interword spaces rather large, e. g. twelve units. If the quadded line which follows is photographed with interword spacing of four units, it would give a cramped or tight appearance following the line of comparatively widely spaced words. Thus the operator would quad the line using, for example, an eight unit "normal" space.

Since each character and each space which goes to make up a line of composition has a width comprising a fixed number of units, it is possible to total the units in any line of composition. Furthermore, it is known, when doing composing work, that a full line will be of a predetermined length and defined as containing so many ems and units. Therefore, apparatus can be provided which, as a line is composed, subtracts the number of units in each character and space of the line from the predetermined line length. In general, when composition of the line is completed, the number of units taken by the character and word spaces will not equal the number of units in the full line, with the result that there is a line remainder of the excess units. Apparatus is therefore provided which will divide the line remainder by the number of interword spaces in the composed line to give a justification increment which must be added to each normal interword space to expand the line to its full or justified length. The line remainder information may also be used to provide quad right information. In this case the line remainder, instead of appearing at the end of the line, would be placed at the beginning thereof in the photographic unit. The line remainder information may also be divided in half so that the composed line can be centered when photographed. Selection of the form in which the line remainder information is read from the computer and coded on the control tape is under the control of the operator who will determine whether the composed line is to be quadded left, centered or quadded right.

It was heretofore pointed out that when a character key is depressed, a width signal was transmitted through a decimal coder unit 94A, 94B, etc. (which one depending on the type face style selected for photographing), the unit space circuit 110, and the binary coder 119. After conversion to binary form in coder 119, the width signal was fed to circuits such as shown in Fig. 6 and thereby controlled interponent solenoids for coding the width information on the control tape in the perforator unit 600.

In the same manner that the information was fed from coder 119 to Fig. 6 circuits for controlling interponent solenoids, the information is also fed from the coder to additional Fig. 6 circuits but, in this instance, the circuit solenoids control the operation of the computer apparatus 130 now to be described with reference to Figs. 7 and 8. More specifically, the width information will be translated into degrees of shaft rotation and such movement used to control the positioning of a read-out device upon which pre-computed information is stored.

A binary indexing device 131 is shown to be operated by binary solenoids 132, 133, 134 and 135, energization of which is controlled as indicated above. Each solenoid is mounted on a bracket with its shaft 136 disposed horizontally. One end of the shaft carries a rocking lever 137 (Figs. 9 and 11) which engages stop screws 140 and 141 which are adjustable to control the degree of rotation of the shaft upon energization and deenergization of the solenoid. The opposite end of the shaft carries an arm 142 which is pivoted to and fro under control of the solenoid, and which is connected to a pivoting lever 143 by link 144. The lower extremity of lever 143 is engaged by a roller 145 carried by pivoting member 146, the member being urged by tension springs 147 so that the roller serves as a detent for lever 143. As solenoid 132 is energized and arm 142 is swung clockwise, link 144 pivots lever 143 in a clockwise direction. The movement of the lever depresses member 146, but immediately upon passage of the lever over roller 145, springs 147 urge member 146 and the roller upwardly to detent the lever in its new position. The detent mechanism also serves to prevent "bounce" of the moving parts. Return of the solenoid to its deenergized position and of lever 143 to its non-actuated position, is accomplished by means of a spring internal to the solenoid. Energization of the solenoid and the accompanying linear movement of shaft 136 results in the actuation of a pair of electrical leaf switches 150 and 151 mounted on solenoid bracket 152 (Fig. 11). The function performed by these switches will be considered hereinafter. The rounded uppermost end of lever 143 is fitted into a notch 153 provided in binary code disk 154 so that when lever 143 is pivoted, disk 154 is similarly rotated to and fro on shaft 155, it being free to turn on the shaft which is fixedly mounted in stand 156 and bracket support 157.

Figures 8, 9, 10, 11:
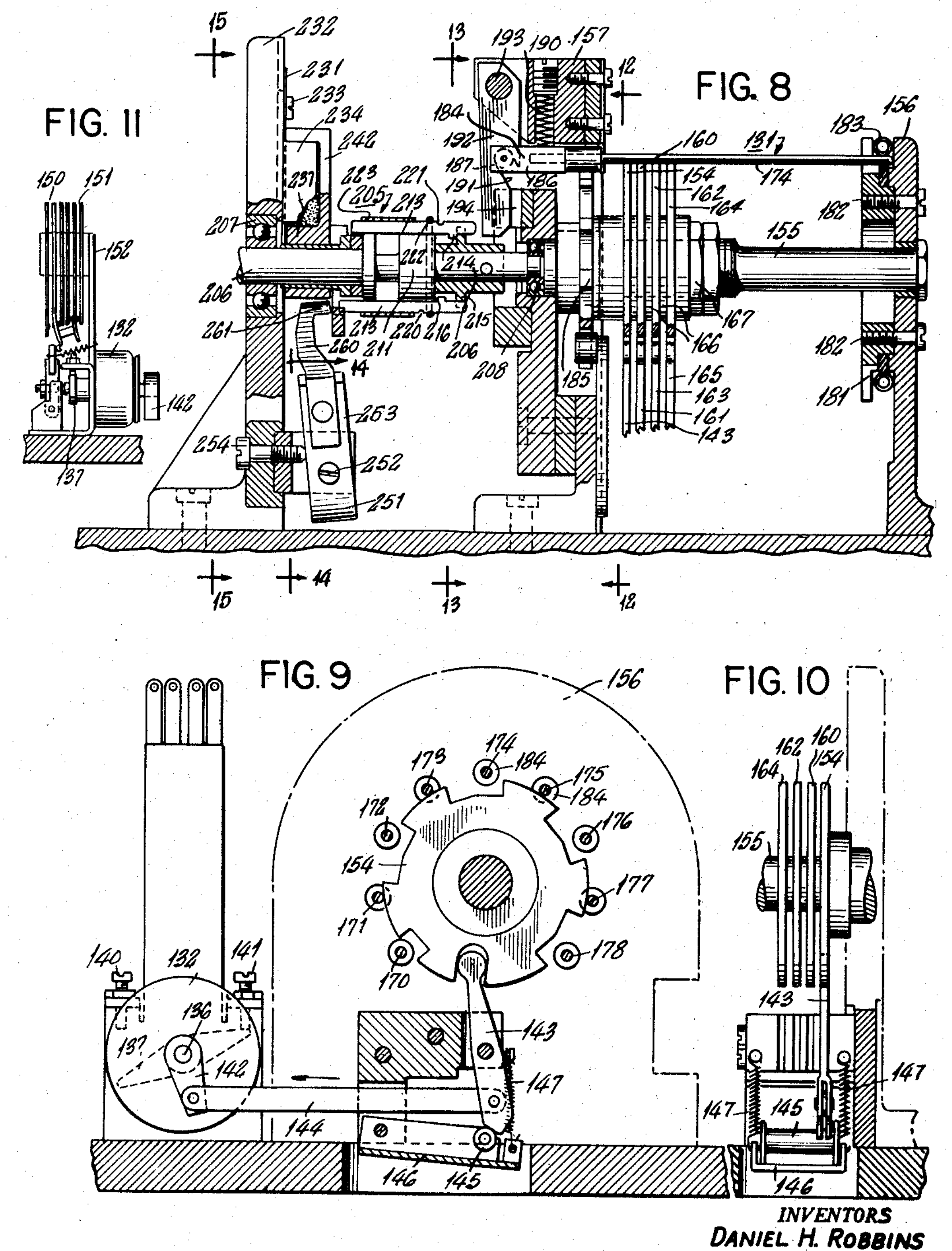
Fig. 8 is a sectional view with parts broken away taken along line 8—8 of Fig. 7.
Fig. 9 is a sectional view taken along line 9—9 of Fig. 7.
Fig. 10 is a side elevation of the mechanism shown in Fig. 9.
Fig. 11 is a detailed view of a binary solenoid and the switch operated thereby.

A similar binary code disk and operating mechanism therefor is provided for each of the binary solenoids (Figs. 8 and 10). Thus, code disk 160 will be actuated by lever 161, the movement of which in turn will be controlled by solenoid 135. Similarly, code disk 162 will be actuated by lever 163, in turn actuated by solenoid 134, and code disk 164 will be actuated by lever 165, the movement of which will be controlled by solenoid 133. The four code disks are all supported on shaft 155 while free to turn thereon. Spacing washers 166 are provided to prevent any endwise shift in the position of the disks and the whole assembly is locked-up by nut 167 threaded onto a threaded portion of shaft 155.

If one was to view the disks in front elevation, they would appear as a complete circle, the circumference of which is unmarred by any notches or breaks except for those notches provided for levers 143, 161, 163 and 165. This composite effect is achieved even though each disk is notched according to a predetermined code which will hereinafter be disclosed.

Supported about the edges of the code disks are nine rods 170, 171, 172, 173, 174, 175, 176, 177 and 178 which, reading clockwise from the lower left side in Fig. 9, have the decimal values 4, 6, 8, 10, 12, 14, 16, 18 and 20. The remote ends of the rods are supported in a slotted collar 181 (Fig. 8) secured to stand 156 by means of threaded bolts 182 and held in place by the annular spring 183. Passing over the coded disks, the rods are threaded into end pieces 184 of enlarged cross section which are supported on sprocket-like disk 185, one tooth being provided for each of the rods. The end pieces terminate in a bifurcated section 186, between the arms of which is furnished a camming member 187. Each end piece and rod is urged inwardly by compression spring 190 which is positioned between set screw 191 and the end piece itself, but the code disks and sprocket-like disk 185 support the rod in the outermost position shown in the drawing. With the rod in this position, camming member 187 is located in an angularly disposed slot 191 notched into depending striker member 192 pivotable at its upper end about pin 193. The lower extremity of member 192 is guided in the indentures of crenellated member 194.

Figures 12, 13, 14:
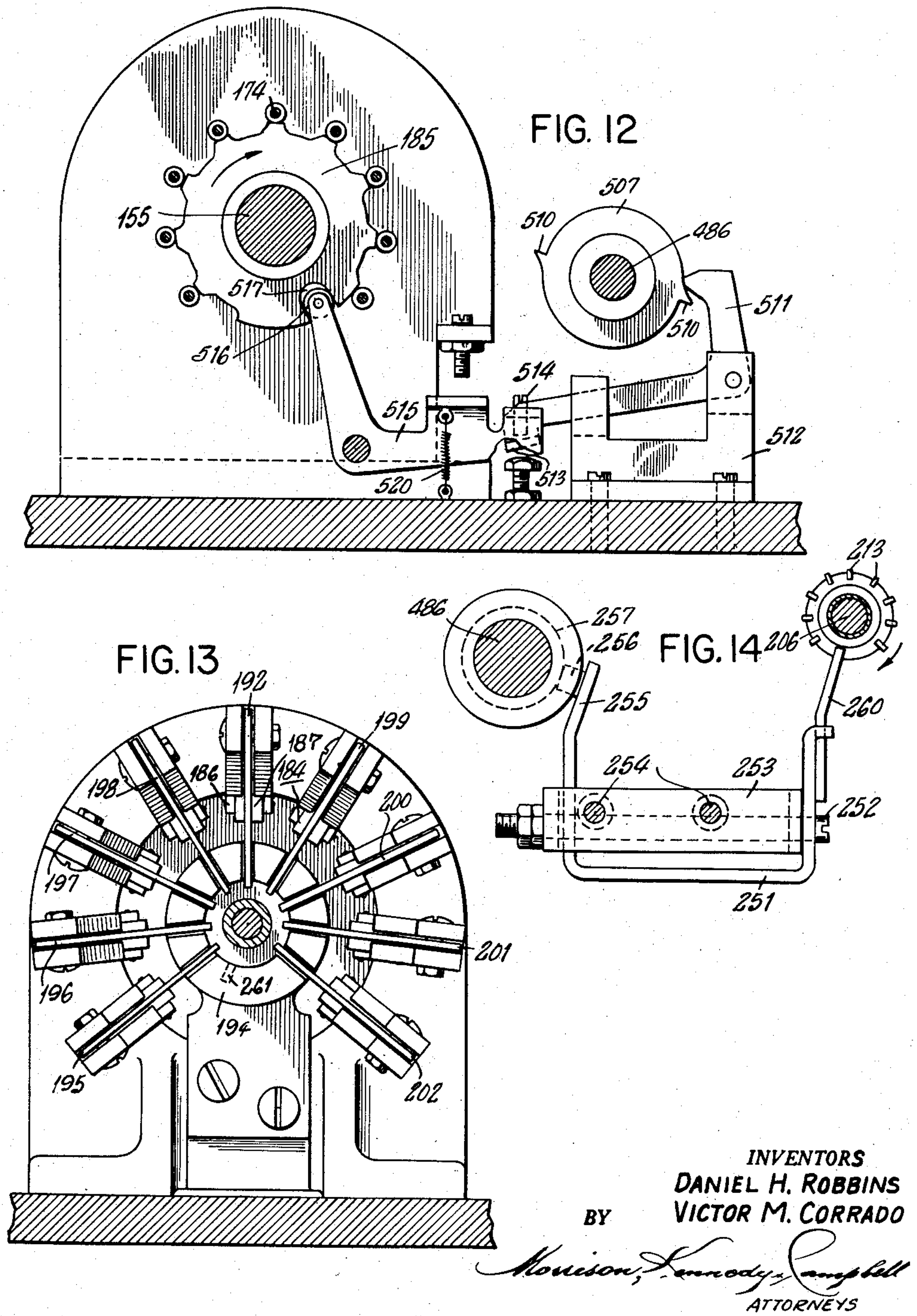
Fig. 12 is a view taken on line 12—12 of Fig. 8.
Fig. 13 is a view taken on line 13—13 of Fig. 8.
Fig. 14 is a view taken on line 14—14 of Fig. 8.

There are, of course, as many striker members similar to 192 as there are rods 170 etc. and these may also be considered to represent various decimal values similar to the rods (see Fig. 13). Thus member 192 has a decimal value of 12, member 195 a value of 20, member 196 a value of 18, member 197 a value of 16, member 198 a value of 14, member 199 a value of 10, member 200 a value of 8, member 201 a value of 6, and member 202 a value of 4.

Immediately adjacent the radially disposed striker members is the squirrel cage assembly 205, comprising a shaft 206 journaled in bearings 207 and 208 secured in bracket 157 (Fig. 8). A rotor 211, pinned to the shaft for rotation therewith, is provided with a plurality of peripheral slots 212 longitudinally disposed for accommodation of rotor bars 213. The bars are slidable between two positions as limited by the engagement of inwardly projecting lugs 214 with the annular ring 215 formed on the rotor or by the engagement of the lugs with the shoulder 216 of the rotor. Each bar is provided with two detents, one 220 for retaining the bar in its normal or non-activated position, and the other 221 for retaining the bar in its actuated or active position. A spring member 222 traversing the outer edges of the rotor bars, engages the detents. A circumambient strip 223 is provided to confine the bars to their respective slots.

Rotation of the squirrel cage is effected through shaft 206, which is driven from the continuously operating motor 224 (Fig. 7) through V-belt drive 225, shaft 226 journaled in pillow blocks, and the slip clutch 227, the latter being biased to engaging position by compression spring 230.

Figure 15:
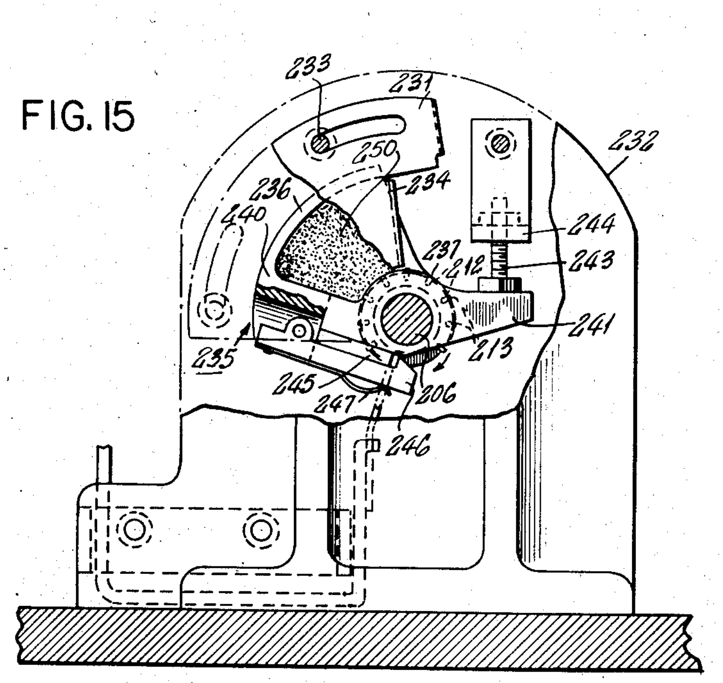
Fig. 15 is a view taken on line 15—15 of Fig. 8 with the wall of the end support broken away.
Figure 15A:
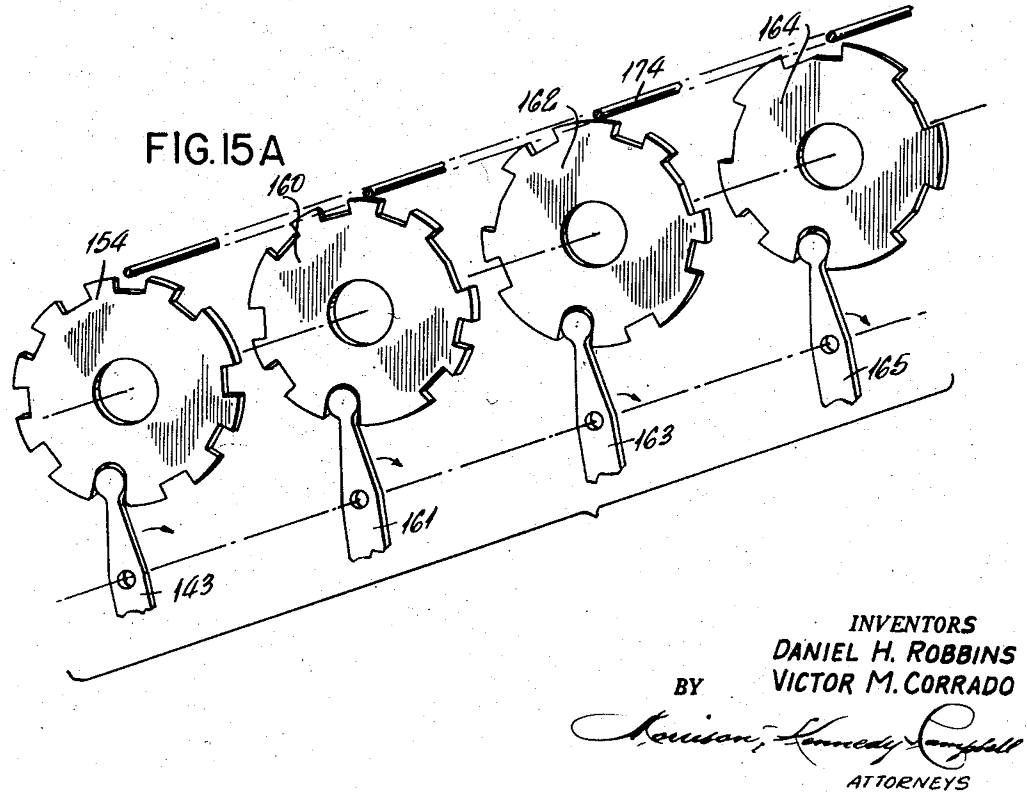
Fig. 15A is an exploded view showing the binary code disk notch arrangement.

Referring now to Figs. 8 and 15, the arresting device for stopping the intermittent advances of the squirrel cage will be described. A stop plate 231 is adjustably secured to one face of bearing stand 232 by means of screws 233. A portion of the plate is bent up so as to form an L 234 projecting perpendicularly from stand 232. A movable bracket assembly 235 is mounted on shaft 206 and is free to turn with respect thereto. The assembly comprises the concentric arm 236 joined to the hub 237 by the radial web 240 and arm 241. An end plate 242 parallel to the face of stand 232 extends from arm 236 to hub 237. The arm 241 abuts screw stop 243 which is threaded in angle bracket 244 and locked in adjusted position by a lock nut. A rotor bar stop 245 is supported by web 240 and is in position to intercept any rotor bar which is in actuated or active position. A primary arresting member 246 is pivotally supported on web 240 and is urged to its arresting position by the leaf spring 247. The configuration of the stop 245 and the arresting member 246 is such that between the abutment end of stop 245 and the L-segment of member 246 a slot or opening is formed of a size sufficient to accommodate a rotor bar. The cavity formed by concentric arm 236, end plate 242 and stop plate 231 is filled with a resilient material 250 such as sponge rubber. Therefore, when the squirrel cage is rotated in the direction of the arrow (Fig. 15), a projected or actuated rotor bar will first strike the inclined surface of primary arresting member 246 to cam the member downwardly against the action of spring 247 and thereby initially slow down the moving rotor bar. As the bar passes the L, it strikes the end of stop 245 and thereby acts to pivot the bracket assembly on shaft 206. Since stop plate 231 is secured to stand 232, the resilient material 250 furnished in the cavity of the device is compressed, thereby absorbing all the energy of the moving masses and bringing the squirrel cage to a halt, whereupon the resilient material returns to its normal expanded condition and bracket assembly restores the actuated rotor bar to its final resting place between stop 245 and member 246, the absolute position being determined by the setting of adjustable screw 243.

To return an actuated rotor bar to normal position, a cam actuated pusher is provided. See Figs. 8 and 14. A U-shaped member 251 is pivotally supported by screw 252 on the angle bracket 253 secured to bearing stand 232 by screws 254. The rearward arm 255 of the bracket carries a cam follower 256 which rides in the cam groove of reset cam 257. The cam effects a forward and backward movement of member 251 and, through the intermediary of extension link 260, restores an actuated rotor bar to its normal position on the forward movement, the projection 261 on link 260 reaching into the slot formed between stop 245 and arresting member 246 to strike the end of the rotor bar. On the backward movement of the U-shaped member, the link projection is restored to its at rest position, free from interference with operation of the rotor bar arresting device.

Having detailed the structure of the binary indexing device and the squirrel cage mechanism, it is believed appropriate to review the operation of the same in more general terms, associating the operation with the receipt of width information from the keyboard.

As has been previously noted, width information is transmitted from the keyboard and associated circuitry to the computer or read-out device in binary form. That is, the width of a character, which may be any number of units between four (4) and eighteen (18) inclusive, a unit one eighteenth of the width of a typographical em, or considering letter spacing, the upper limit may be twenty-one (21) units, is transmitted as the binary components of a decimal value. For example, a unit width decimal value of fifteen appears as binary information eight, four, two, and one, the sum of which equals the decimal value of width. While all decimal values from four to twenty-one can be represented by the binary components, one, two, four, eight and sixteen, only the even number binary components are utilized in the binary indexing device. The omitted single unit component is utilized in another portion of the computer unit and will be considered hereinafter.

Assume that one rotor bar is projected to active position and in engagement with stop 245. Next assume that the binary solenoids are energized in response to width information of twelve units. This means that solenoids 135 and 134 will be energized since they represent the binary values four and eight. Code disks 161 and 163 are turned in the manner heretofore explained. These disks, as well as the non-actuated disks, are notched in such a way that the rod 174 having a decimal value of twelve will no longer be supported on the circumference of the code disks. In a similar manner, if only code disk 161 was actuated in response to energization of solenoid 135 having a binary value of four, the code notching of all the disks would be such that the rod 170 having a decimal value of four would no longer be supported by the code disks themselves. It is thus clear that by appropriate notching of the code disks, selective actuation of the disks will permit a single rod to become unsupported by the disks, which rod will have a decimal value assigned thereto equal to the sum of the binary values of the actuated code disks.

Referring again to the specific example wherein rod 174 is no longer supported on the code disks, the rod will not immediately move inwardly since it is still supported on sprocket-like disk 185. However, when disk 185 is turned to remove the cog supports from beneath all of the spindle rod end pieces, only rod 174 will move inwardly under the urging of spring 190 since this is the only rod unsupported by the code disks.

The time in the cycle of operation at which sprocket-like disk 185 is actuated to permit the inward movement of an indexing device bar, e. g. 174, preconditioned for such movement by the operation of the binary code disks as hereinabove described, is controlled by indexing cam 507 mounted on cam shaft 486.

Reference is now made to Fig. 12 wherein is shown index cam 507 and the linkage mechanism controlled thereby to turn disk 185. The cam itself is formed with two protuberances 510, one of which is effective during each cycle of operations. Cooperating with the protuberances and actuated thereby is bell crank lever 511 which is pivoted in bracket member 512. The remote end of the lever is bent into an L 513 which underlies the downward projecting stud 514 provided on crank 515. A roller 516 is fitted into disk notch 517 so that when crank 515 is pivoted, disk 185 is likewise pivoted or turned. The counterclockwise pivoting of crank 515 is effected by the clockwise pivoting of lever 511 which is in turn effected by the cooperation of lever 511 and protuberance 510. A tension spring 520 is provided to restore the elements to their normal positions.

As the rod 174 is pivoted inwardly toward shaft 206, cylindrical member 187 cams the striker member 192 clockwise (Fig. 8), causing it to push a rotor bar to an actuated position. Striker member 192 and rod 174 are immediately returned to their normal positions by the reverse pivoting of disk 185. Furthermore, since a newly actuated rotor bar is in projected position, U-shaped bracket 251 is cam operated to restore the previously actuated rotor bar to its inactive or normal position. Immediately, shaft 206 rotates a distance until the newly actuated rotor bar engages the stopping member 245, whereupon clutch 227 (Fig. 7) begins to slip due to the locking up of shaft 206. The distance or degree of rotation of the shaft prior to its arrest, however, was proportional to the number of width units introduced to the binary solenoids and effective to actuate the indexing device and squirrel cage mechanism. Successive width information signals will result in the intermittent stepping of the sqirrel cage mechanism and shaft 206, with the end result that the shaft rotates an amount proportional to the total of the width information introduced to the unit.

A spur gear 262 (Fig. 7) keyed to shaft 206, and therefore rotatable therewith, drives differential driving gear 263 through the agency of gear train 264, the latter supported in cantilever fashion on shaft 265 journalled in bearing stand 232. The differential driving gear 263 and bevel gear 266 are integrally formed and supported on shaft 267, there being no connection between the shaft and gears, which are free to turn thereon. Bevel gear 266 engages spider gear 270 which is secured to shaft 267 and consequently shaft 267 is rotated an amount proportional to the width values introduced through the binary solenoids. Shaft 267 is directly connected to computer or read-out drum 271 which therefore is positioned in accordance with the width information fed to the computer unit from the keyboard.

So far, it has been shown that drum 271 is positioned only in response to even width values such as four, six, eight, ten, twelve, fourteen, sixteen, eighteen, or twenty units. Since certain characters will have an odd width value, such as seventeen, it remains to be shown how such information is handled.

Taking the value seventeen, for example, it is clear that this comprises the components sixteen and one. The width component sixteen, being an even number, is transmitted to shaft 267 through the binary indexing device above described. The component one is transmitted to shaft 267 through differential drive gear 272 and bevel gear 273. See Figs. 16 and 18. The gears 272 and 273 are free to rotate on shaft 267, but since gear 273 engages spider gear 270, which is connected to shaft 267, rotation of gears 272 and 273 effects rotation of the shaft to add the width value of one. A stepping switch 274 is provided to actuate gear 272 in response to width values of one and, therefore, the switch may be considered a binary one switch, similar in function to the binary solenoids which have the values, two, four, eight and sixteen.

Figures 16, 17, 18, 19:
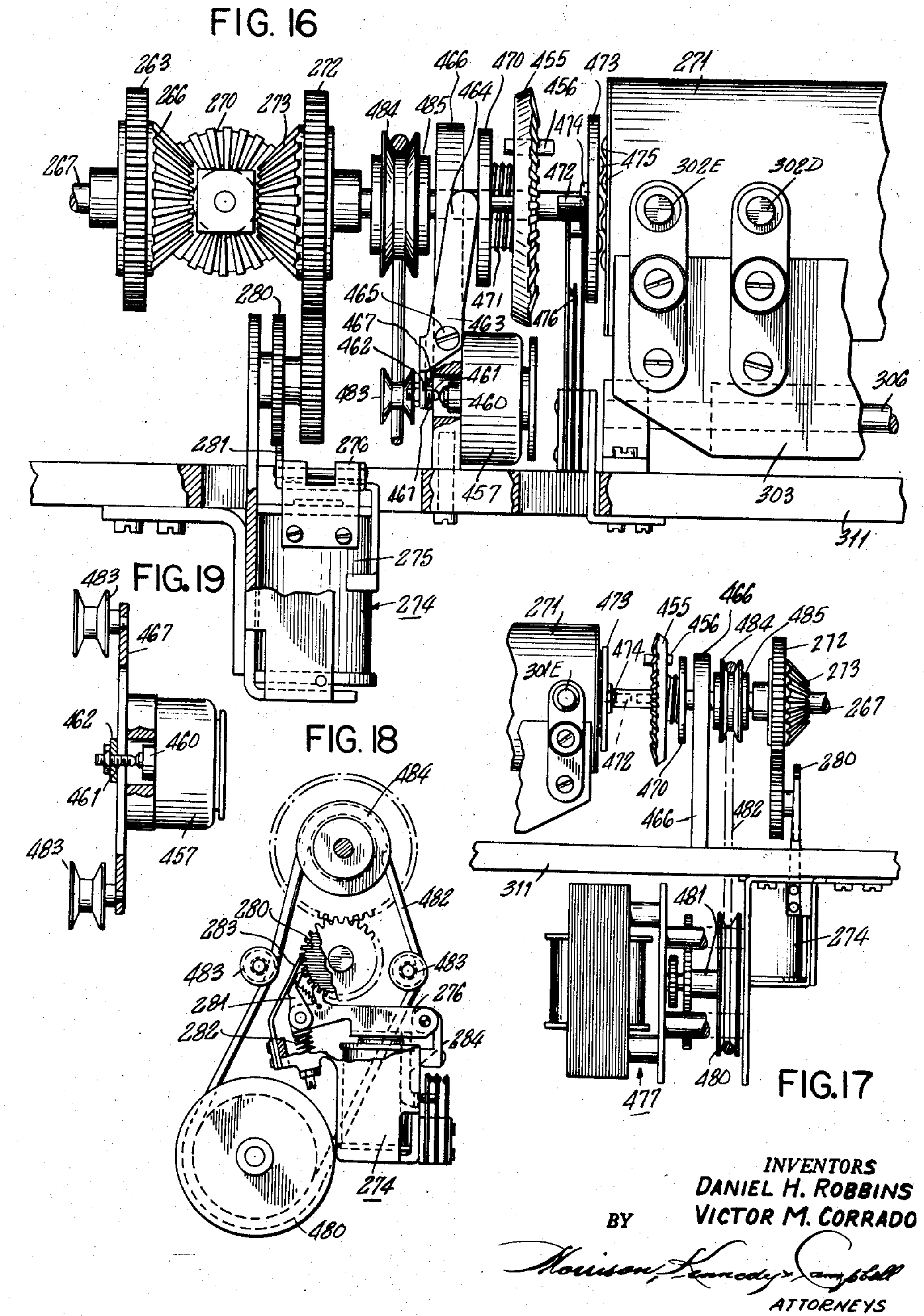
Fig. 16 is a partial rear elevation of the differential and coded drum mechanism.
Fig. 17 is an elevation of the mechanism for resetting of the coding drum.
Fig. 18 is a detailed view of the unit count stepping mechanism.
Fig. 19 is a detailed view of the ducking pin solenoid mounting arrangement.

Energization of switch coil 275 pivots armature 276 counterclockwise in Fig. 18, thus removing locking teeth 277 from engagement with ratchet wheel 280 and drawing pawl 281 into engagement with the next lower tooth of the ratchet. Upon deenergization of the coil, spring 282, which was placed in compression, returns armature 276 to its normal position permitting pawl 281 to rotate the ratchet one position. Locking teeth 277 engage the wheel after it has been so advanced to prevent any additional movement thereof taking place. A leaf spring detent 283 is provided to prevent reverse movement of the ratchet when armature 276 is energized and pawl 281 moved to the next lower tooth preparatory to an advance of the wheel. The step by step movement of wheel 280 is of course carried over to differential driving gear 272, with the result that spider gear 270 drives shaft 267 in response to the one unit count introduced by switch 274. An angle bracket 284, secured to armature 276, actuates a pair of electrical leaf switches 285 and 286, the function of which is similar to that of the binary solenoid actuated switches and will be described hereinafter.

The computer or read-out drum 271, which is directly driven by shaft 267, is thus seen to be positioned in accordance with the width information transmitted to the unit from the keyboard. As has been previously indicated, the drum is used to provide code information which will be used in the photographic unit to perform the functions of line justification, quadding, or centering. That portion of the drum which provides justification information is similar in theory to the computer drum disclosed in the aforementioned application Serial No. 422,526 except for certain mechanical improvements made thereto.

Reviewing the theory of the justification drum, it is recalled that the drum is initially positioned, before composition of a line takes place, according to the desired length of a full or justified line. Then as a line is composed, the drum is intermittently stepped as above described in response to the width information for the individual characters transmitted to the binary indexing device. The drum may make many revolutions during line composition but when the total width information supplied thereto reaches within four (4) ems, or seventy-two (72) units in the eighteen unit system, of the originally set line length, the drum will be so positioned that at any time thereafter the operator may depress a justification button on the auxiliary keyboard and read out a justification answer from drum 271.

The justification portion 287 of the drum will be divided into five sections longitudinally and these will be assigned the binary values one, two, four, eight and sixteen, respectively. See Fig. 20. Circumferentially, the drum will be divided into two segments, one for reading a quotient answer and one for reading a quotient remainder answer. Thus, this portion of the drum directed to justification answers will comprise ten segments, each of which may be considered to be divided by grid lines into seventy-two (72) rows or longitudinal divisions, and twenty-four (24) columns or circumferential divisions. Now, for each of the ten segments there is provided a read-out device, or ten read-out devices in toto. Five of the read-out devices will read quotient answers and five will read quotient remainder answers. The five quotient read-out devices are arranged in a line parallel to the axis of the drum and gang connected. Similarly arranged and connected are the five quotient remainder read-out devices, but these are located on the remote side of the drums from the quotient read-out devices. The devices thus form a reference past which the drum rotates, but they are also themselves moved, as by being mounted on a carriage and stepped longitudinally along the length of the drum. Stepping of the read-out devices takes place, one step for each interword space in the composed line. Therefore, if there are ten interword spaces, the carriage carrying the read-out devices will have been stepped ten times, and each time a step occurred, the read-out devices will have moved from one column of the segment with which they are associated to the next adjacent column. If the devices are positioned at the start of a line in column 0 then after being stepped ten times as for ten spaces, they will be positioned in column ten. Since there are twenty-four columns, twenty-four spaces can be accommodated in a single line of composition.

Having specified that the drum is stepped past the read-out devices in response to character width information and the read-out devices themselves moved with respect to the drum, a specific example will be considered to illustrate the drum coding. Assume that row 65 of the drum (there will be two such rows, one for quotient answers and one for quotient remainder answers) has been brought opposite the read-out devices. This will mean that the total unit widths of all the characters and normal word spaces are 65 units less than the number of units in a full line or in other words, the line remainder is 65 units. The length of a full line is immaterial for our present consideration. Assume further that the read-out devices are opposite column 10 of their respective segments. This means that there are ten interword spaces in the line of composition. For justification, therefore, the sixty-five units line remainder must be apportioned between the ten interword spaces. By carrying out simple division, dividing 65 by 10, there is obtained a quotient of 6 and a quotient remainder of 5. Therefore, the drum must be coded to give these answers, and the quotient read-out devices associated with the segments assigned binary value 4 and binary value 2 will be actuated, the remaining three quotient read-out devices being, in this example, non-actuated. Actually, the coding on the drum will be such that the normal word space of four units will be added to the quotient. In the specific example above, while the quotient is six, row 65 and column 10 of the drum will be coded to give the answer ten. The quotient remainder read-out devices associated with the segments assigned binary value 4 and binary value 1 will be actuated to give the true quotient remainders, the remaining three quotient remainder read-out devices being non-actuated. All possible answers stemming from any combination of from 0 to 72 units line remainder and from 1 to 24 interword spaces, with a few exceptions for the less likely combinations (e. g. a 72 unit line remainder with 1 interword space), have been computed and coded on the drum. In theory, line remainders greater than 72 units and interword spaces greater in number than 24 could be accommodated, but these figures were chosen as normal and practical limits.

Figure 21:
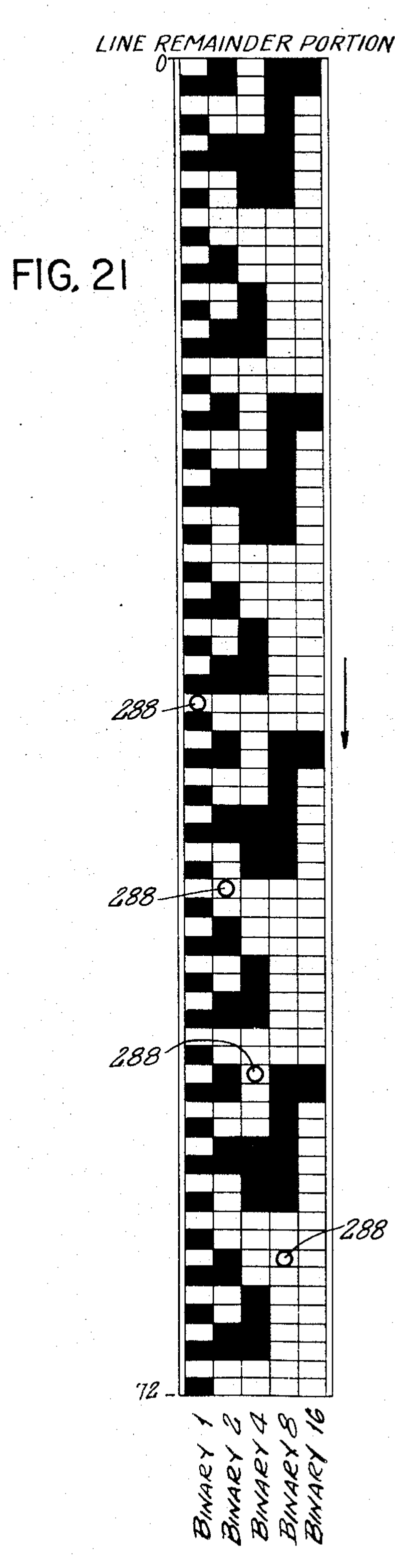
Figs. 21 and 22 are developed views of the quadding code section of the computer drum in enlarged detail.
Figure 22:
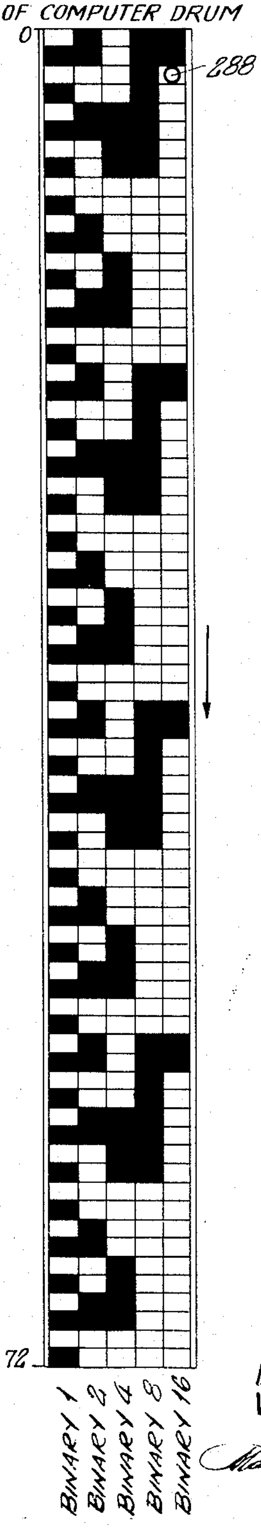

In Figs. 21 and 22, the line remainder portion of drum 271 is shown in enlarged detail. The coding of Fig. 21 will appear on the drum adjacent the quotient remainder information while the coding of Fig. 22 will appear adjacent the quotient information. It will be noted that this portion of the drum is divided into five columns which, looking from left to right, have the binary values 1, 2, 4, 8 and 16 respectively. The circular markings 288 represent references past which this portion of the drum moves, and they are shown relative to the code markings in a normal or full line position. That is, if after the drum is set for a particular line length and total width information equal to the pre-set line length is introduced to the computer apparatus, the drum will come to rest relative to the reference point in the position shown in the figures. Read-out devices will be placed at the reference points to read the code markings. In the normal position, the read-out devices will read zero, which means that the line is full and the units-of-an-em remainder is zero. If in keyboarding the line, the width information transmitted to the computer apparatus did not equal the pre-set line length, then the drum will be displaced from the reference points by the deficiency in the line. For example, if the line deficiency is two units, then the drum, which advances in the direction of the arrow shown in the figures, will be positioned with respect to the read-out devices located at the reference points such that the row, two positions below the row shown coinciding with the reference points, will be in cooperative relationship to the read-out devices. Thus the value two will be read from the drum. As a further example, if the line deficiency is twelve units, the drum will be coded to give the value twelve, i. e. binary 4 and binary 8.

The coding on the line remainder portion of the drum is such that, if the drum is stepped in a reverse direction (opposite to that in which it rotates when receiving width information from the keyboard), the line remainder values go from one to eighteen, one to eighteen, one to eighteen, etc. This is due to the use of an eighteen unit system in the present apparatus. It is thus clear that this section of the drum will at all times give the units-of-an-em remainder in a line, regardless of the pre-set line length or the total line remainder. The ems remainder in a line will be obtained from mechanism hereinafter described.

Figure 20:
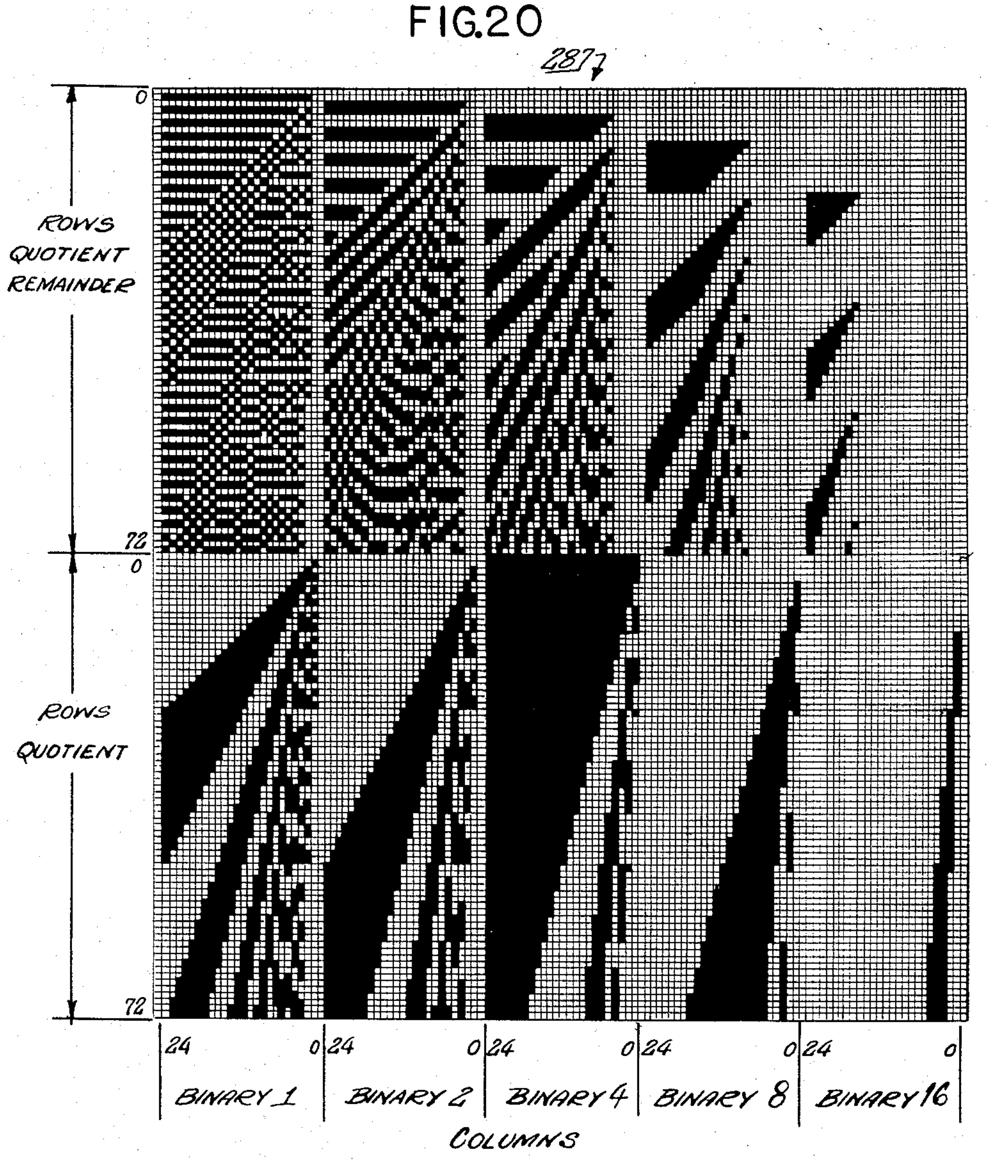
Fig. 20 is a developed view of the justification portion of the computer drum.

In the present apparatus, a drum coded by way of opaque and transparent elements is preferred since it permits of easy manufacture and is of light weight, thus reducing the mass and minimizing inertia effects. See Figs. 7, 23 and 24. A clear transparent cylinder 290 is secured to hub 291 and annular ring 292. The hub is keyed to shaft 267, while ring 292 is journaled for rotation in end supporting bracket 293. A cold cathode light tube 294, arranged in the interior of drum 271, is fixedly supported in non-rotating member 295. The surface of the transparent cylinder is encased by a sheet 296 (see Fig. 7A) on which the coded justification information has been placed. The sheet may be in the form of a photographic negative with opaque portions 297 and transparent portions 298. The transparent portions will be those which cause the actuation of the read-out devices, which are photocells. Photocells 300A, 300B, 300C, 300D and 300E read the units-of-an-em line remainder from drum portion 271. Photocells 301A, 301B, 301C, 301D and 301E read the quotient answers from drum portion 287 and represent binary values 1, 2, 4, 8 and 16 respectively. Photocells 302A, 302B, 302C, 302D and 302E read the quotient remainder answers from the drum portion 287 and represent binary values 1, 2, 4, 8 and 16 respectively. In Figs. 20, 21 and 22, the portions of the drum which are actually transparent are shown blackened, while the opaque sections are shown in white.

Figure 39:
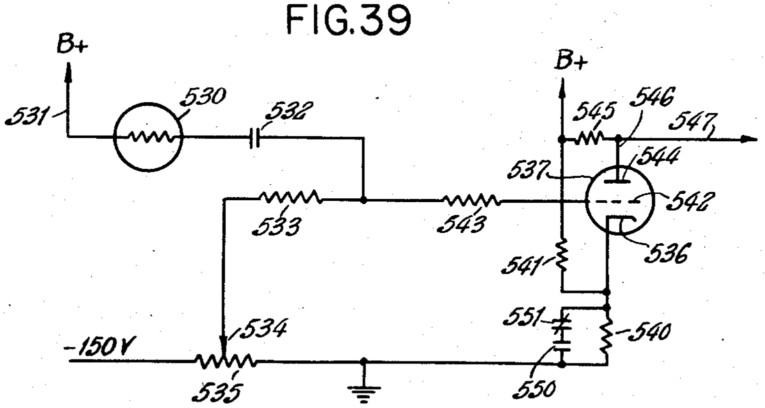
Fig. 39 is a schematic representation of the photocell circuit used in the computer apparatus.

In Fig. 39 there is shown an enlarged detail of a photocell pick-up circuit and attention is now directed to the workings thereof. One terminal of photocell 530 is connected by lead 531 to a B+ power supply, while the other terminal is connected through contacts 532, resistor 533, movable brush 534, and a portion of bias potentiometer 535 to ground. In its quiescent state, no current flows through the photocell. Contacts 532 are provided for controlling when the circuit will be effective. For example, if the photocell is one of those which read justification information, then contacts 532 will be engaged when the operator depresses the justification push button on the auxiliary keyboard.

The cathode 536 of tube 537 is connected to ground through cathode resistor 540 and to B+ through resistor 541. The grid 542 is connected to bias potentiometer 535 through grid resistor 543 and resistor 533. The plate 544 is connected to B+ through resistor 545; and, from point 546, intermediate plate 544 and resistor 545, a lead 547 extends to other circuitry, e. g. the circuit shown in Fig. 6. In the cut-off state of tube, the arrangement is such that the cathode is maintained at +25 volts while the grid is maintained at −20 volts.

In the operation of the circuit, as when photocell 530 is rendered conductive by the imposition of light thereon and contacts 532 engage, current will flow through the photocell circuit, above described, to ground with the result that grid 542 voltage is raised from −20 to 0 volts. The tube 537, however, still is non-conductive due to the cathode being at +25 volts. Thereafter, when contacts 550 engage to short circuit cathode resistor and drop the cathode voltage to ground potential, tube conducts and the potential at point 546 falls from its B+ value to a value near ground potential, depending on the tube voltage drop. Still later in time, contacts 551 separate to again raise the cathode voltage to +25 volts and thus interrupt conduction in the tube. The potential of point 546 now rises to the B+ value, with the result that a positive voltage pulse is transmitted over lead 547 to the next succeeding circuit or, in the example given, to the Fig. 6 circuit. In that circuit, the positive pulse fires the thyratron and energizes a perforator interponent solenoid.

Figures 23, 24, 25, 26, 27:
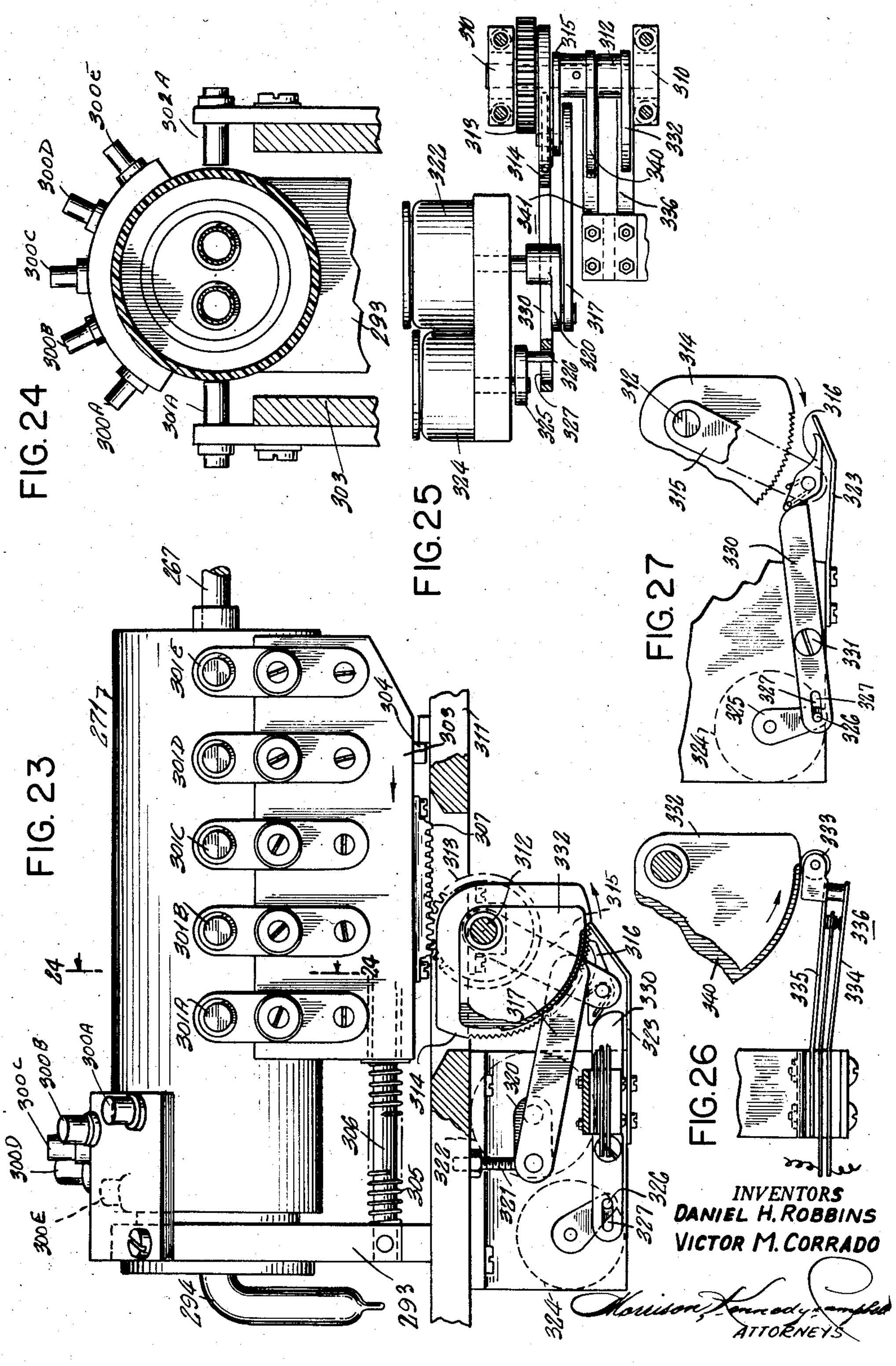
Fig. 23 is an elevation of the photocell carriage stepping mechanism.
Fig. 24 is an end view on line 24—24 of Fig. 23 showing the relationship of the photocells used to read line remainder information.
Fig. 25 is a plan view of the photocell carriage stepper mechanism.
Fig. 26 is a detailed segmental view of the cam and switch mechanism of the photocell carriage stepper mechanism.
Fig. 27 is a detailed view of the photocell carriage stepper mechanism release device.

In Figs. 23, 24 and 25, the five photocells 300A, 300B, etc. which read line remainder information, are shown stationarily mounted on arcuate plate 299 which is fixedly secured to supporting bracket 293. Therefore, as drum 271 is rotated, as by receipt of width information from the keyboard, it is stepped past the stationary line remainder reading photocells. The ten photocells which read the justification information are shown mounted on channel shaped carriage 303 which is urged to a start-of-line position, abutting stop 304 by carriage return spring 305. The carriage is supported for sliding movement on guide rods 306, while underneath the carriage is a rack 307 for effecting such movement. A pair of pillow blocks 310, depending from baseboard 311, rotatably support shaft 312 on which is mounted pinion 313. The pinion engages rack 307, whereby rotative movement of the pinion results in translation of the rack and, consequently, the carriage. Keyed to shaft 312 is a toothed segment 314, while swinging arm 315 is free to turn thereon. The lower extremity of the arm carries a pawl 316 biased to engagement with toothed segment 314. A link 317, pivotally connected to arm 315, is at its other end pivotally connected to solenoid arm 320. In its inactive position, arm 320 abuts stop screw 321 which limits the throw of the solenoid arm. Energization of interword space solenoid 322, as by depressing a space key on the keyboard, pivots arm 320 counterclockwise, thereby pushing on link 317 and pivoting arm 315 counterclockwise. The pawl 316 carried by the arm, being in engagement with segment 314, pivots the segment counterclockwise to rotate shaft 312 and pinion 313 and thereby translate carriage 303 one step to the left (Fig. 23). Upon deenergization of solenoid 322, a spring (not shown) returns solenoid arm 320 to its at-rest position abutting stop screw 321 and, with it, arm 315 carries pawl 316 back into engagement with the next succeeding tooth on segment 314. An elongated spring-like finger 323 engages the toothed segment and prevents the segment from being pivoted clockwise as pawl 316 is returned to its pre-stepping position. Upon the next energization of solenoid 322, the process is repeated and the carriage and photocells mounted thereon are again stepped one position. The extent of movement of the photocells will be from one column on the drum to the next adjacent column, as explained above.

At completion of a line of composition and after the justification information has been read from the coded drum, a circuit is completed for energization of reset solenoid 324 to pivot arm 325 in a clockwise direction (Fig. 27). A pin 326, carried by the arm and extending through elongated slot 327 of lever 330, pivots the lever about pin 331. The other extremity of lever 330 engages the underside of pawl 316 and therefore pivots the pawl clockwise. Pawl 316 in turn engages the reverse motion detent 323 and forces it out of locking engagement with segment 314. Immediately thereupon, compression spring 305 returns carriage 303 and the photocells to a start-of-line position.

A pair of switch actuating cams are also keyed to shaft 312 (Fig. 26). The first cam 332 has a contour which permits switch roller 333 to ride into the dwell thereof after an initial movement indicates that several spaces have been included in the line. In this manner, a circuit is controlled which permits a reset operation to be accomplished only at a time when it is likely that justification information can be read from the drum. By riding into the cam dwell, roller 333 removes the tension from switch contact arms 334 and 335, thereby actuating switch 336. The second cam 340 is contoured such that the switch 341 controlled thereby is not actuated until approximately twenty-two spaces have been stepped off by the carriage stepping mechanism. This switch 341 is similar in construction to that described in the preceding paragraph and it performs the function of controlling circuits to signal the operator that only a few more spaces can be coded in the line being composed, otherwise the self-imposed limits of the justification drum will be exceeded.

It was heretofore stated that the computer or read-out drum was initially positioned in accordance with the full or justified length of the line. Reference will now be made particularly to Figs. 7, 28, 29 and 34 for a description of the line length setting indicator.

A rearwardly extending shaft 342, to one end of which is pinned a pinion gear 343 and to the front end of which is splined a knob 344 and unit set indicator dial 345, is journaled in supporting brackets 346 and 347. A pair of spaced apart members 350 are pivotally supported on the forwardmost bracket 346 and are urged by spring 351 to exert a clamping action on knob detents 352. A spur gear 353 is also pinned to shaft 342 between the two brackets 346 and 347. Engaging this gear and driven thereby, as knob 344 is rotated, is a pinion gear 354 secured on shaft 355 as by pin 356, shaft 355 being rotatably supported above shaft 342 in brackets 346 and 347. A groove cam 357 is keyed to shaft 355 for rotation therewith. An electrical switch 348 (Fig. 7), is actuated when dial 345 is in a set position, but moves to its non-actuated position when knob 344 and dial 345 are withdrawn preparatory to a line length setting operation.

Figures 28, 29, 30:
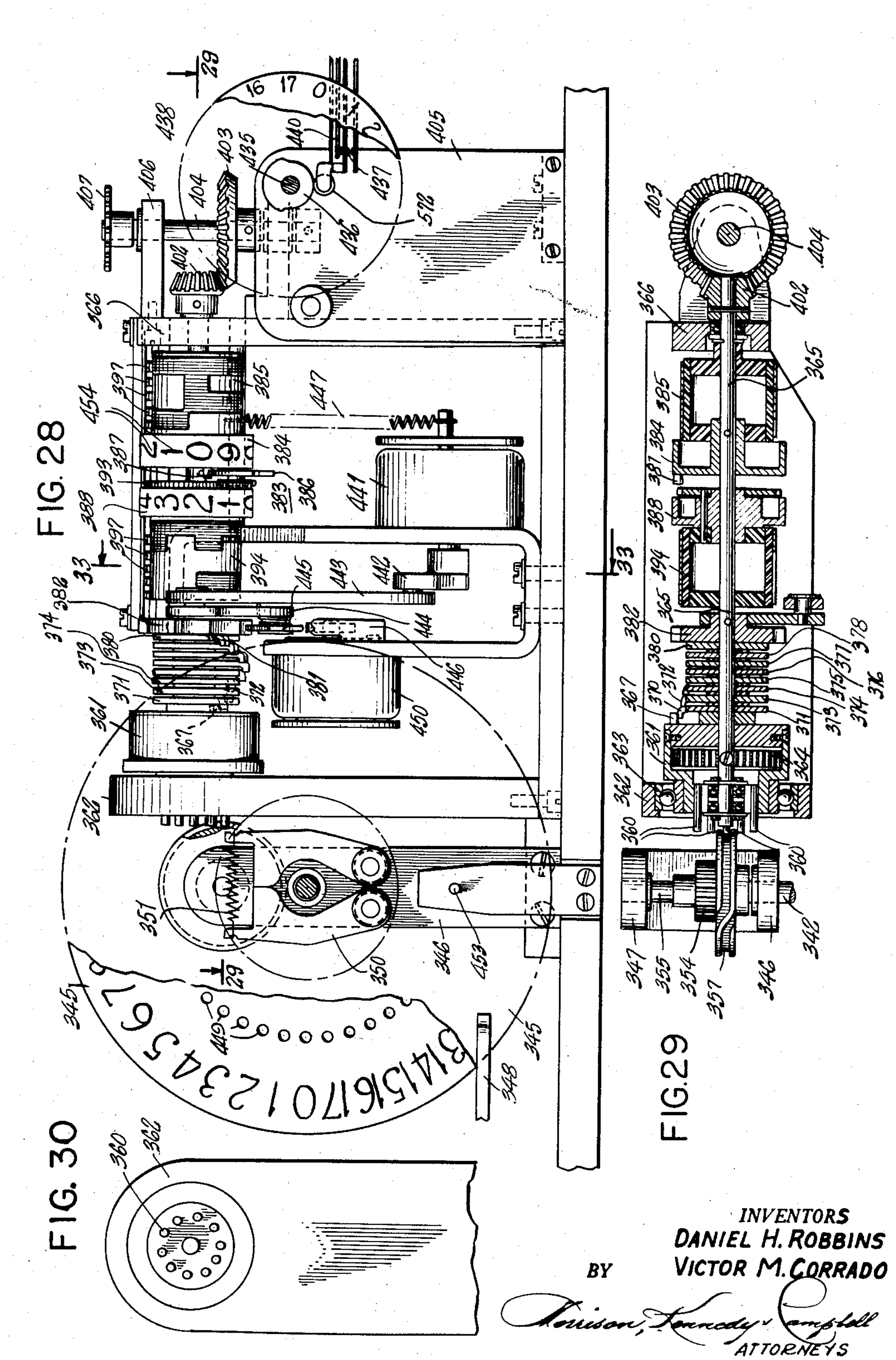
Fig. 28 is a front elevation showing the line length setting mechanism.
Fig. 29 is a plan section on line 29—29 of Fig. 28.
Fig. 30 is a side elevation of the pin arrangement for rotation of the line length mechanism setting shaft.

A plurality of pins 360, projecting from the end of spring casing 361 and arranged in a circular array, are positioned to be engaged by cam 357 (Figs. 29 and 30). Therefore, if one pin is in the groove of cam 357 and the cam is rotated, at the completion of one revolution of the cam, the pin will have been transported a distance equal to the throw of the cam and the next following pin will enter into the cam groove.

The spring casing 361 is supported for rotation in bracket 362 by ball bearings 363. A clock spring 364 is enclosed in casing 361 with the outer end thereof fastened to the interior wall of the casing and the inner end thereof secured to shaft 365, the shaft being journaled in the end wall of casing 361 at the center of the circularly arranged pins 360 and in the stand 366. A pawl 367 projects from casing 361 and abuts a pawl 370 on washer 371, the washer being freely supported on shaft 365 and able to rotate relative thereto. The side of the washer pawl 370, opposite to that which abuts pawl 367, is itself abutted by pawl 372 of washer 373. This abutment process continues for all of washers 374, 375, 376, 377, 378 and 380, each of which is provided with an abutment pawl, until the pawl on the last washer 380 is engaged by pawl 381 of ratchet wheel 382. The ratchet wheel is pinned to shaft 365, as is one end of spring 364. Consequently, if spring 364 is given an initial tension as it is, all of the aforementioned pawls, from the one provided on spring casing 361 through those on the washer assembly to the one on ratchet wheel 382, will pile up and abut one another as shown in Figs. 28 and 29.

Figure 36:
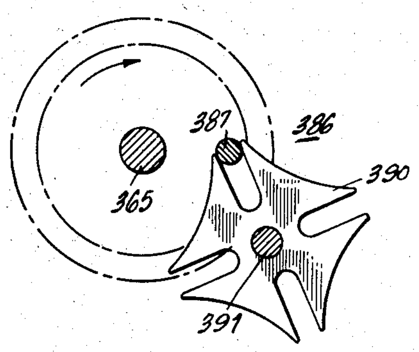
Fig. 36 is a rear view of the operating mechanism for the em counter.
Figure 35:
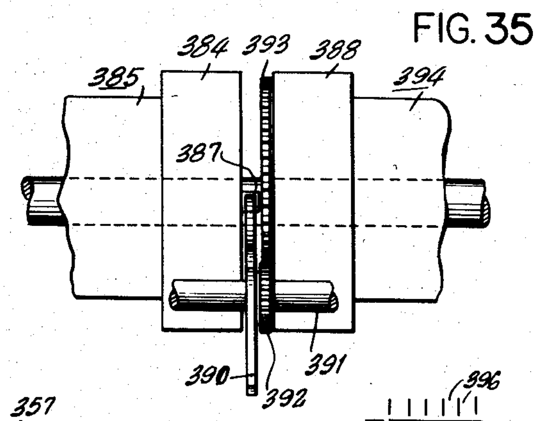
Fig. 35 is an elevation of the em counter.

A Veeder-Root digit wheel counter 383, designed for adding and subtracting, is also furnished in the line set component of the computer or read-out mechanism now under consideration. The units count wheel 384 thereof is pinned to shaft 365 and therefore is actuated as the shaft is rotated. Integral with wheel 384 is coded contact cylinder 385 which will be hereinafter considered. The tens count wheel 388 is free to turn on shaft 365 and it is actuated by a Geneva movement 386 (Fig. 36) driven from the units count wheel 384. A pin 387, mounted in the side face of wheel 384, engages a star wheel 390 rotatably mounted on shaft 391. A pinion 392 on shaft 391 drives gear 393 to which the tens count wheel is connected (Fig. 35). The arrangement is such that for each revolution of the units count wheel 384, tens count wheel 388 makes one tenth of a revolution. A coded contact cylinder 394 is also provided integral and movable with the tens count wheel.

Figure 37:
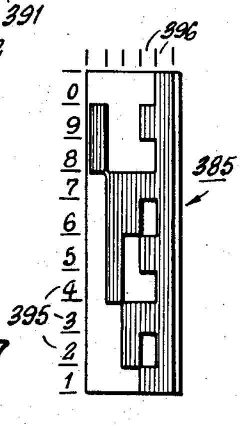
Fig. 37 is a developed view of the counter wheel contact cylinders.

The coded contact cylinder for both the units count wheel and the tens count wheel is shown in developed form in Fig. 37. The surface of the cylinder may be considered as divided by a grid into ten segmental divisions 395 corresponding to the ten positions taken by a wheel in making one revolution and five bands or strips 396 encircling the cylinder. Each of the segmental divisions may be considered to have a decimal value so that the circumference represents the decimal values one to ten. This corresponds with the ten positions of the units count wheel and the ten positions of the tens count wheel. The bands or strips may be considered to have the binary values 1, 2, 4 and 8 with the first strip being common. In Fig. 37, the shaded portion represents electrical conducting means, while the white or non-shaded portion represents insulated material. All of the conducting portions of the cylinder surface are connected together electrically. A plurality of finger type switches 397 (Figs. 28 and 33) make contact with each strip of the cylindrical surfaces 385 and 394. These switches, both for the units count coded cylinder and for the tens count coded cylinder, are mounted on switch bracket 400 and serve as a reference past which the coded cylinders pass. In this capacity, they provide in binary fashion coded information corresponding to the count indicated by the wheel. For example if the units count wheel is so positioned that the designation seven is visible through the opening 401 (Fig. 31) in the cover plate, the coded cylinder will be positioned with respect to switches 397 such that the switches contact the electrical conducting elements representing the binary values 1, 2 and 4 and the common element. The coded cylinder associated with the tens unit wheel 394 operates in precisely the same fashion. Therefore, the ems remainder in a line will be available in binary form and coded as tens of ems and units of ems. For example, if the line remainder is 34 ems, the information will be coded as binary three (3) by the tens coded cylinder and binary four (4) by the units coded cylinder. Thus, with the mechanism described with reference to Figs. 21 and 22 whereby units-of-an-em line remainder is coded, mechanism has been provided which will code the line remainder information as ems and units-of-an-em.

Figure 31:
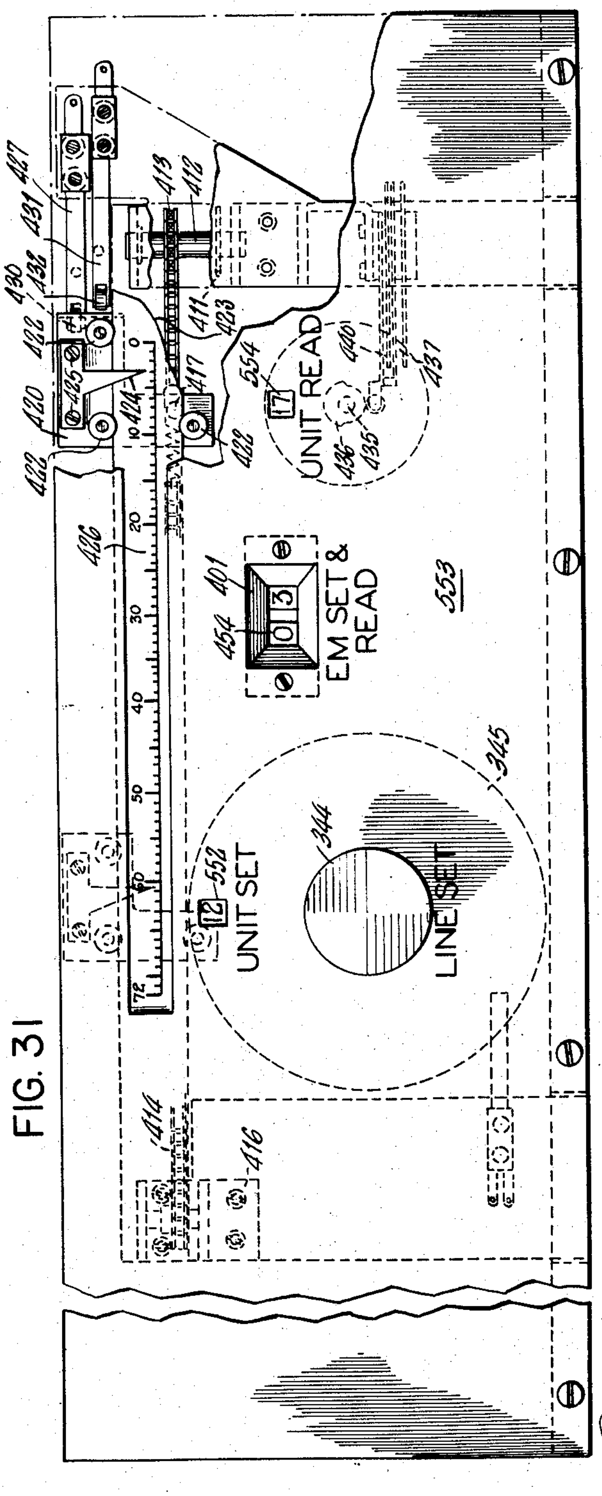
Fig. 31 is a front elevation of the front panel of the present mechanism with parts broken away to show the line length scale and pointer.
Figure 32:
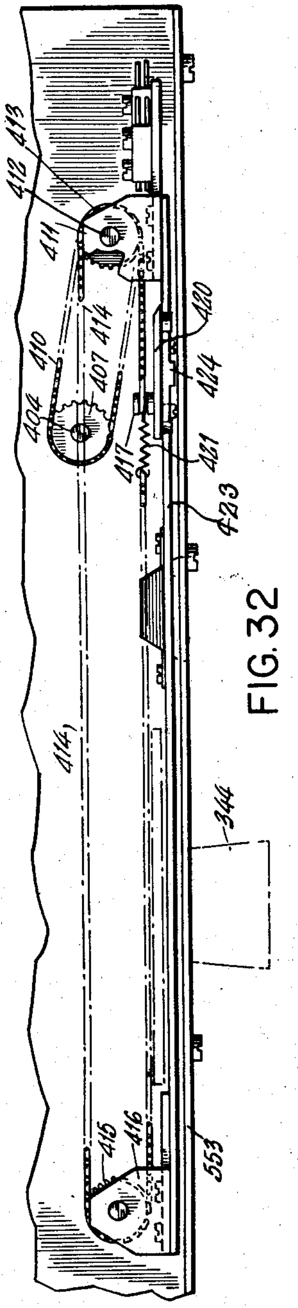
Fig. 32 is a top plan view of Fig. 31 to show the driving elements.

The pinion 402 mounted on the extremity of shaft 365 and to which reference was above made, meshes with bevel gear 403 which is pinned to the vertically extending shaft 404 (Figs. 28 to 30). The shaft is journaled in pillow block 405 at its lower end and in guide 406 near its upper end. A sprocket wheel 407 is provided at the upper end of the shaft and an endless chain 410 is trained thereover to drive sprocket wheel 411 keyed to vertical stub shaft 412 (Figs. 31 and 32). An additional sprocket wheel 413 is keyed to shaft 412 and a chain 414 is placed thereover as well as over sprocket wheel 415 rotatably mounted in bracket 416. One end of chain 414 is fastened to a stud 417 protruding from the reverse side of carriage 420, while the other end of the chain is also connected to stud 417 but through spring 421. The carriage is provided with three rollers 422, two of which ride on the upper edge of guide rails 423 and the last of which rides on the lower guide rail edge. A pointer 424 secured to the carriage by screws 425 coincides with linear em scale 426.

A pair of roller actuated electrical switches are positioned at the end of the em scale in position to be actuated by carriage 420. The first switch 427 is located so that its roller 430 is engaged by carriage 420 when the pointer indicates that four ems remain in the line. A circuit is controlled thereby to signal the machine operator that he is within justification range and that the line being composed may be thereafter ended and a justification answer obtained from the computer unit. The second switch 431 is so located that its roller 432 is engaged by carriage 420 when the pre-set line length has been exceeded and the pointer has gone beyond the zero mark on scale 426. The operator will then take a corrective action.

The foregoing description covers the mechanism whereby the dials and indicator are set preparatory to a composing operation. Next to be described is the mechanism which actuates the dials to give a continuous indication of line remainder as a line is being composed.

Figures 7, 7A:
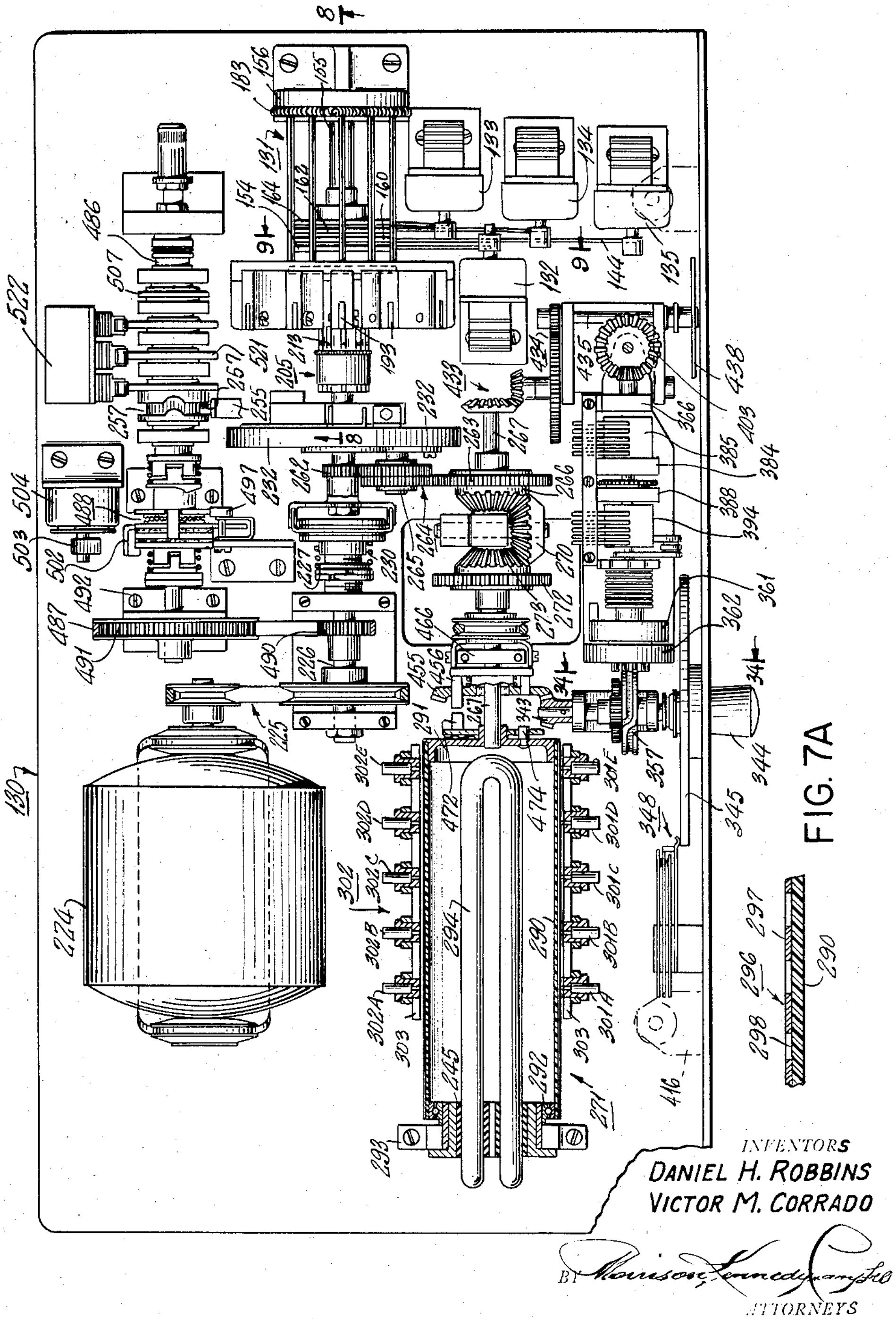
Fig. 7 is a top plan view of the apparatus for totalizing the width information of the characters in a line of composition.
Fig. 7A is an enlarged sectional view showing a segment of the computer drum.

The width values for the individual characters which make up the line are transmitted to gears 263 and 272 and through them to spider 270 (Fig. 7). The spider, being pinned to shaft 267, rotates the read-out drum in accordance with such width information. Shaft 267 in addition to turning drum 271, also, through bevel gears 433 and spur gears 434, rotates shaft 435, units-of-an-em read dial 438 and cam 436 mounted on the shaft (see Fig. 28). The gear ratios are such that cam 436 makes one revolution for each eighteen units, or one em, transmitted to drum 271. During one revolution of the cam, contacts 437 engage and disengage while contacts 440 disengage and engage.

Figure 33:
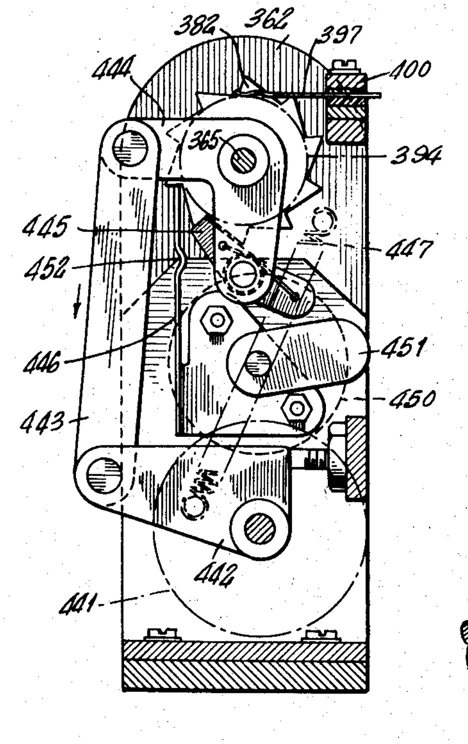
Fig. 33 is a side elevation taken on line 33—33 of Fig. 28, showing the line length indicator actuating and reset mechanism.

Engagement of contacts 437 energizes the em indicator actuating solenoid 441 (Figs. 28 and 33) to pivot arm 442 counterclockwise in Fig. 33. A link 443 connected thereto pivots bell crank lever 444 counterclockwise and a pawl 445 mounted thereon is thereby carried to engagement with the next succeeding tooth of ratchet wheel 382. A detent 446 prevents reverse rotation of wheel 382 when pawl 445 is being set as above. Upon deenergization of solenoid 441, as when contacts 437 disengage, a tensioned spring 447 restores the elements to their original position shown and thereby advances the ratchet one step. The ratchet, of course, is keyed to shaft 365 and actuates the Veeder-Root counter 383. As width information is fed to the indicator mechanism and rotates shaft 365, spring 364 is being tensioned. Also washers 371, etc. are being unwound.

At the completion of a line of composition, circuitry is completed for the energization of the em indicator reset solenoid 450. Arm 451 is thereupon pivoted counterclockwise and it engages pawl 445 to pivot it out of engagement with the ratchet tooth which it was then engaging. In being so pivoted, pawl 445 strikes the bent portion 452 of detent 446 to thereby pivot the detent out of locking engagement with the ratchet tooth. The ratchet is now free to turn, as is shaft 365. Therefore, spring 364 which was tensioned during the composing cycle (since casing 361 was locked in position as will hereinafter be described) will now restore the indicators to their start-of-line position as determined by lug 367 on spring casing 361. That is, the shaft 365 will rotate until washer assembly 371, etc. winds up.

Figure 34:
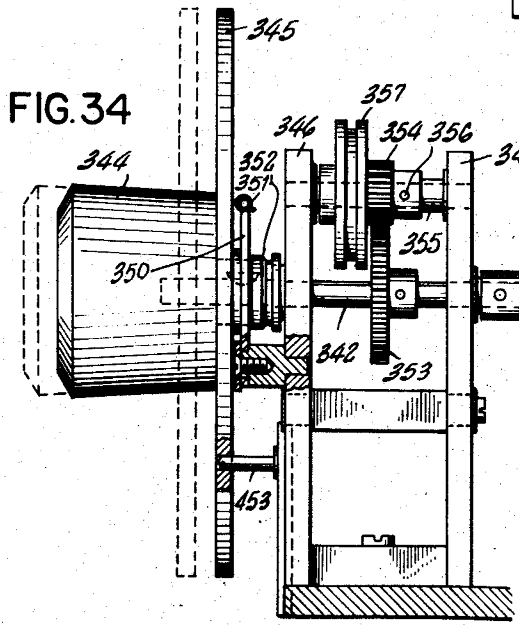
Fig. 34 is a side elevation taken on line 34—34 of Fig. 7, showing the line length indicator setting knob assembly and associated elements.

To set the computer or read-out unit for a particular line length representative of a full or justified line, the operator pulls knob 344 and dial 346 forward on shaft 342 (Fig. 34). In so doing, the detent hole 449 on dial plate 345 is disengaged from locking pin 453, thus permitting the knob to be turned and with it the entire line length setting mechanism. One-half revolution of knob 344 represents 18 units as shown on dial 345 or 1 em, and inasmuch as the gear ratio between gears 353 and 354 is 2 to 1, cam 357 rotates one revolution to advance the pin disk by one pin. A total of ten pins are provided and therefore the spring case 361 is rotated one-tenth of a revolution. Since case 361 is tied to shaft 365 by pre-tensioned spring 364, shaft 365 also is rotated one-tenth of a revolution. Units count wheel 384 is rotated one-tenth of a revolution to increase or decrease the count thereof by one, depending on the direction in which knob 344 is rotated. For each complete revolution of shaft 365 and wheel 384, as by rotating knob five complete revolutions or 10 ems, tens count wheel 388 is stepped one-tenth of a revolution through the Geneva movement. The tens count wheel 388 and units count wheel 384 therefore may be used to indicate ems set into the line. Accordingly, appropriate markings 454 are placed on the circumference of the wheels, such markings visually indicating the em setting for the line to be composed. Rotation of shaft 365 also results in pointer 424 indicating the em setting for the line to be composed.

It was heretofore stated that the line length setting mechanism also controlled the start-of-line position of read-out drum 271 and now such structure as does control this initial position will be described. The pinion 343 located on shaft 342 meshes with bevel gear 455 (Fig. 7), the latter being rotatably supported on shaft 267, i. e. gear 455 is free to turn independent of shaft 267. A so-called "ducking pin" 456 is carried by the gear and is spring biased to a non-engaging position wherein it is retracted toward the reverse side of the gear, the pin itself extending therethrough.

When a line is to be composed and drum 271 positioned in accordance with the setting for the line length, solenoid 457 (Fig. 16) is energized, causing the shaft 460 thereof to be extended and push against screw 461, which latter is adjustably mounted in the depending lug 462 of pivoting frame 463. The frame comprises a pair of upwardly extending arms 464, through which pivot pins 465 pass to the upright supporting member 466, and a cross piece 467 from which lug 462 depends. The upper extremities of the arms 464 bear against pressure plate 470 which is normally urged by a compression spring 471 in a direction opposite to that in which the plate is moved by frame 463. The rightward movement of plate 470 (Fig. 16), as when solenoid 457 is energized and arms 464 bear against the plate, compresses spring 471 and causes the plate to engage ducking pin 456 and project it to the extended position wherein it is in the path of the stop pin 472 carried by the disk 473. Disk 473 is mounted on shaft 267 and is free to turn with respect thereto. It is connected to drum 271 by a plurality of tension springs (not shown) which permit a limited amount of relative rotative movement therebetween but which restore the members to their original positions. A pin 474 (Fig. 7), carried by the drum, extends through an elongated slot in disk 473 and limits the amount of relative movement therebetween. The adjacent surfaces of the drum and the disk each are provided with a plurality of abutments 475 in the form of rivet heads arranged in a circular pattern with those abutments on the disk 473 interlocking, or alternately disposed, with those on the plate. With this arrangement, as stopping pin 472 engages ducking pin 456, disk 473 is abruptly halted, but drum 271 continues to move. In so moving the springs connecting the drum and disk 473 are tensioned. Furthermore the relative movement causes the disk to move away from the drum since the abutments 475 serve as cam members. Such movement of disk 473 separates contacts 476 and this effect is utilized in the control circuitry to indicate that the apparatus is in a start-of-line position.

The motive means for driving the drum for the start-of-line or reset operation is the electrical motor 477 mounted beneath the baseboard 311 of the apparatus (Figs. 17 and 18). A pulley 480, mounted on the motor shaft 481, drives an endless belt 482 over two idler pulleys 483 to turn the driven pulley 484 which in turn rotates shaft 267. Pulley 484 is operatively connected to shaft 267 by an overrunning clutch 485. In this manner, the drive to shaft 267 can come either from pulley 484, as in a reset operation, or from spider gear 270, as in the normal line composing operation.

The computer apparatus heretofore described in detail, while driven by continuously rotating motor 224, is also controlled as to sequence of operations by control cam shaft 486 (Fig. 7) upon which are mounted various timing cams. A drive for shaft 486 through slip clutch 488 is obtained from motor 224 by a toothed belt 487 trained over sprocket wheels 490 and 491, the latter sprocket wheel being keyed to the shaft which is journaled in bearing stand 492.

Figure 38:
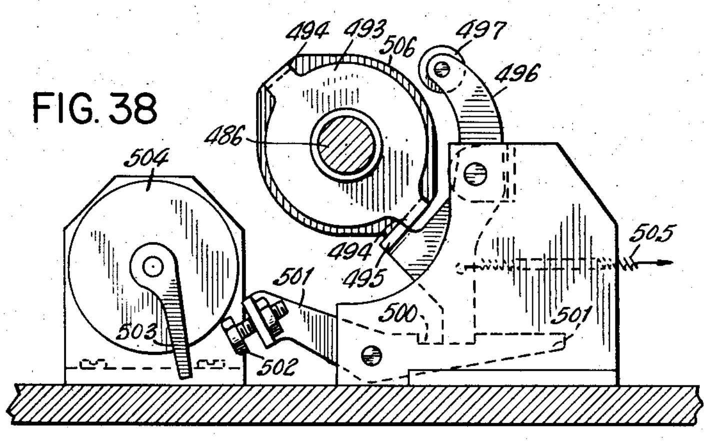
Fig. 38 is a side elevation of the single cycle starting and stopping device.

Referring specifically to Fig. 38, a cycle of operations cam 493 is shown mounted on cam shaft 486. The cam is shown with two detents 494 which are engaged by a dog 495 on locking lever 496, the lever being pivotably supported for a rocking movement and carrying a follower roller 497 at its upper extremity. The lower end of lever 496 is fitted into a notch 500 formed in lever 501. A spring 505 urges lever 496 in a counterclockwise direction, whereby dog 495 disengages detent 494, but the lever is restrained by its engagement with notch 500 of lever 501. The end of lever 501 is provided with an abutment member 502 which is positioned to be struck by the swing arm 503 of solenoid 504. When the solenoid is energized, arm 503 strikes member 502 and pivots lever 501 clockwise, tensioning return spring 505 but removing the notch from locking engagement with lever 496. Spring 502 thereupon pivots lever 496 to disengage dog 495 and detent 494.

Immediately upon release of the shaft 486 for rotation, roller 497 falls on cam surface 506. After one quarter turn of shaft 486, lever 496 has been pivoted to its original locking position with dog 495 ready to engage detent 494. Solenoid 504 is deenergized and arm 503 restored to neutral position, whereupon spring 505 returns lever to its locking position with notch 500 engaging the lower end of lever 496. When shaft 486 has completed one-half revolution, detent 494 engages dog 495 to arrest further shaft rotation whereupon clutch 488 begins to slip. It is thus seen that a 180 degree rotation of shaft 486 is permitted for each energization of solenoid 504 and a complete cycle will be effected during this period.

The sequencing cam shaft 486 carries the rotor bar reset cam 257 (see also Fig. 14) which resets a previously operated squirrel cage rotor bar and thereby permits new width information to be transmitted to the read-out or computer drum as previously described. Also carried by the shaft 486 is index cam 507, the function of which was heretofore described with reference to Fig. 12. Additional cams 521 may be provided to control the actuation of electrical switches 522 and circuits controlled thereby, the function of which is not germane to the present invention.

Having described the mechanical and electrical details whereby a signal corresponding to a depressed character key of the keyboard is transmitted to the control tape perforator interposer solenoids (to code the character both as to identity and width) and to the read-out device, so that information for controlling composition of a line in the photographic unit may be obtained after the line is keyboarded and coded on tape, the information itself being coded on the control tape immediately following the character signals for the line to which it is applicable, a summary of the procedures to be followed in keyboarding a line will be described as well as a summary of operations of the unit. The description will make reference, where appropriate, to certain individual control circuits which will be shown in the drawings, but no attempt will be made to describe a control wiring diagram which would be used in an actual machine since such an attempt would only complicate the description without aiding in an understanding of the present invention.

The control circuitry, for the most part, is employed in certain instances when machine functions are specified or called for at the beginning of a line or before composition of a line, as by actuation of the keyboard character keys, and when the line of composition is completed and the end-of-line sequence is initiated. In this latter sequence, justification or line remainder information for quadding right or centering operations is read from the read-out device and coded on the control tape. In addition, the read-out device is sent to its start-of-line position preparatory to the keyboarding of a new line.

Figure 40:
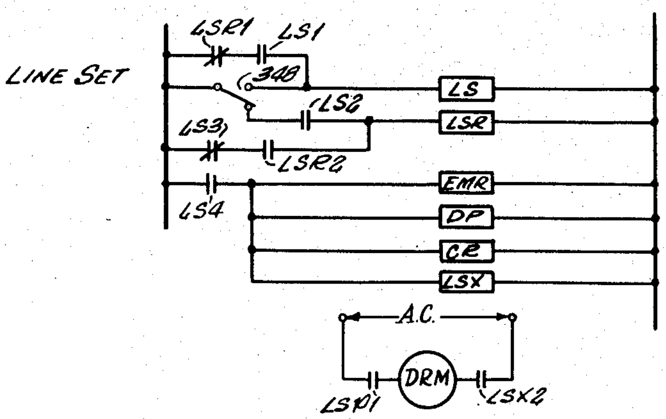
Fig. 40 is a schematic circuit diagram for several line set and reset solenoids employed in the present apparatus.

The first operation performed by the machine operator is to set the mechanism for the desired line length of the material to be composed. An electric switch connecting the circuits to the power source is closed and the circuitry thus prepared for operation. The line set dial 345 is withdrawn from its detented position to the position shown in dotted lines in Fig. 34, preparatory to the actual setting of the desired line length. The forward movement of the dial results in the actuation of switch 348 to complete a circuit for line set relay coil LS as shown in Fig. 40. Contacts (not shown) of this relay separate to prevent the energization of certain circuits prior to setting of the line length and the return of the dial to its normal position. Contacts LS4, which engage upon energization of coil LS, complete a circuit for the em indicator reset solenoid EMR (450 in Fig. 33). As previously explained with reference to Fig. 33, energization of the solenoid results in the pivoting of detent 446 out of its active position to thereby permit shaft 365 to be rotated.

The operator thereupon commences to rotate knob 344 either clockwise or counterclockwise, depending on the previous line length setting and the line length being currently set. Each one-half rotation of knob 344, and with it dial 345 and shaft 342, causes shaft 365 to rotate one-tenth of a revolution and em counter 383 to change its reading by one em. At the same time, shaft 365 is turning bevel gear 403 to set pointer 424 along scale 426 to give a corresponding visual indication of line length in ems.

When the knob 344 has been rotated an amount such that the em indicator and pointer 424 show the desired number of ems for the line to be composed, and dial 345 is positioned such that the desired subdivision of an em, i. e. units-of-an-em, is viewed through window 552 of the mechanism cover 553, further rotation is arrested, since both the visual means for indicating line length and the gear 455 carrying the ducking pin 456 are then set in accordance with the desired line length. The pin 456, of course, determines the start-of-line position of drum 271.

While knob 344 is being manipulated to set the mechanism for the desired line length, line set relay coil LS remains energized as shown in Fig. 40. Contacts LS4, in addition to completing a circuit for the em indicator solenoid EMR (450), also complete a circuit for ducking pin solenoid DP (457), space reading carriage reset solenoid CR (324) and auxiliary line set relay coil LSX.

Energization of the ducking pin solenoid results in the pin 456 being projected to its intercepting position, wherein it will abut the stopping pin 472 carried by plate 473. Energization of the carriage reset solenoid CR pivots lever 330 counterclockwise (see Fig. 27), thereby removing dog 316 and detent 323 from engagement with ratchet 314 and permitting compression spring 305 (Fig. 23) to act against carriage 303 and restore it to its initial position against stop 304. Energization of auxiliary line set relay coil LSX engages contacts LSX1 and LSX2, with the result that the drum reset motor DRM (477 in Fig. 17) is connected to an A. C. voltage supply and thereby operated. Consequently, through belt 482 and overrunning clutch 485, shaft 267 is rotated to bring drum 271 to its initial or start-of-line position as determined by the abutment of stop pin 472 and ducking pin 456. As pin 472 and plate 473 come to a halt, the inertia of the rotating masses tends to maintain drum 271 in motion, with the result that there is a separation of drum 271 and plate 473 as the rivet heads 475 engage. The separation occurs as by plate 473 moving leftwardly (Fig. 16) to cooperate with the drum home position switch 476. Separation of the switch contacts signals the end of a reset cycle. In normal composition, the re-setting operations also occur at the completion of a line but the circuits for the end-of-line re-setting operations are not shown since they involve sequencing considerations which would unduly complicate the description while not contributing to an understanding of the present invention.

The other extremity of shaft 267, which is rotated to bring drum 271 to its start-of-line position, acts through bevel gears 433 and spur gears 434 to turn shaft 435 on which is mounted units-of-an-em read dial 438. The numeral on dial 435 which is visible through window 554 of cover plate 553 will, therefore, indicate at this time the number of units-of-an-em over and above the number of ems for which the line is set. The reading on dial 438 will, of course, correspond with the reading on setting dial 345. Contacts 437 and 440 (Fig. 28) actuated by cam 436 mounted on shaft 435 are ineffective during this initial line setting operation and consequently circuits controlled by switch contacts will not be considered now, but later on, when operations during which they are effective are considered.

After the mechanism has been set as described, knob 344 is restored to its normal position and one of the detents 449 coacts with pin 453 to lock the mechanisms in the adjusted position. Restoration of knob 344 and dial 345 to normal positions actuates switch 348, the contacts of which interrupt a circuit for coil LS but a self-holding circuit through contacts LSR1 and LS1 maintains the coil in an energized condition. Engagement of the back contacts of switch 348 completes a circuit through contacts LS2 for the line set reset relay coil LSR, thus resulting in the separation of contacts LSR1. Separation of these contacts interrupt the circuit for coil LS, thus permitting contacts controlled thereby to be restored to normal condition. Contacts LS2 separate to deenergize coil LSR and contacts LS4 separate to interrupt the circuit for em indicator reset solenoid EMR, ducking pin solenoid DP, carriage reset solenoid CR and auxiliary line set relay coil LSX. Contacts LSX1 and LSX2 controlled by the latter relay coil separate to deenergize drum reset motor DRM.

Thus, the mechanism has been set for a particular line length (which is indicated on em indicator 383, em scale 426, and units-of-an-em dials 345 and 438), and is now in readiness to be actuated, as by keyboarding of a line.

Prior to beginning the letter by letter composition of a line, the machine operator will in general perform several auxiliary or preparatory operations which will control composition insofar as point size of composition, leading between successive lines and type face style of the characters are concerned. Thus, signals will be coded on the tape which when read or decoded in the photographic machine will control the point size of the imaged characters, the leading between lines of imaged characters and the type face style of the characters to be imaged on the sensitized sheet.

Figure 41:
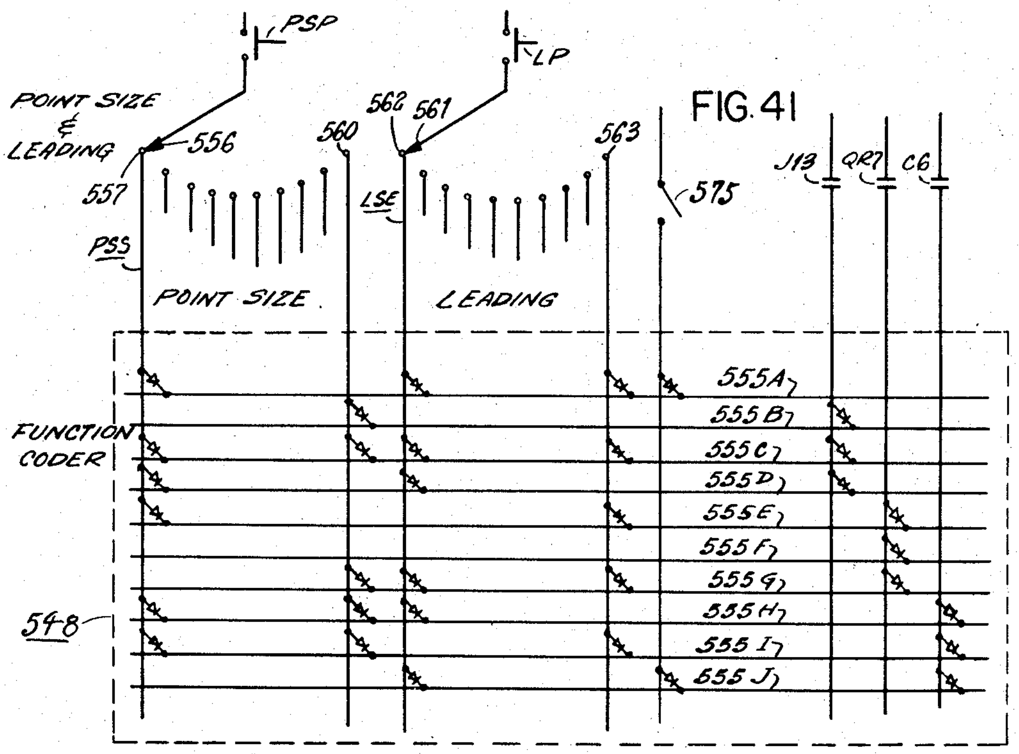
Fig. 41 is a schematic representation of one portion of the function coder.

Referring to Fig. 41 a "function" coder 548 is shown. The coder circuit is so denominated inasmuch as machine function signals, as contrasted to character identification or width signals, are coded on the tape through the intermediary of this circuit. Each of the ten output conductors, 555A, 555B, 555C, etc., is connected to a perforator interponent solenoid circuit, as shown in Fig. 6. Certain of the function coder circuits will be in parallel with character identification coder circuits and therefore are connected to the same Fig. 6 circuit as are such character identification coder circuits.

A point size selector switch PSS is provided on an auxiliary keyboard 549 (Fig. 1) and the operator, by swinging brush 556 to a desired position, e. g. to contact 557, will ready a circuit for coding point size information on the tape. Each position to which brush may be swung will correspond to a predetermined point size which will indicate on the keyboard. Thus, by swinging brush 556 until it coacts with contact 557, the operator will have selected a point size, e. g. 6 points, at which photography will take place in the photographic unit. If after selecting the desired point size, the attendant depresses point size push button PSP, a signal representative of the selected point size will be coded, the signal comprising perforations associated with the interponent solenoid circuits, i. e. Fig. 6 circuits, connected to function coder output wires 555A, 555C, 555D, 555E, 555H and 555I. By way of further example, if the attendant swings brush 556 to a position wherein it coacts with contact 560, this contact being provided for a twelve point signal, after depressing button PSP, circuits will be traced to coder output wires 555B, 555C, 555G, 555H and 555I so that five interponent solenoid circuits will be energized and a corresponding number of perforations punched in the control tape.

Similar to the point size selector switch, is the leading selector switch LSE. Under circumstances of ordinary text composition, the spacing between successive lines is equal to the point size of the text composition. Thus, if the text is twelve point, the spacing between lines will be twelve point. In the art this is termed "solid composition." There are times when it is desirable to increase the spacing between lines over that provided by solid composition. To do so is to "lead" the lines. The leading selector switch is mounted on the auxiliary keyboard and the operator, by swinging brush 561 to a desired position, e. g. to contact 562, will ready a circuit for coding leading information on the tape. Each position to which brush may be swung will correspond to a predetermined amount of leading which will be indicated on the face of the keyboard. Thus, by swinging brush 561 until it coacts with contact 562, the operator will have selected the amount of leading, e. g. 6 points, which will appear between successive lines of text as photographed in the photographic machine. If after selecting the desired leading, the operator depresses the leading push button LP, a signal representative of the selected leading will be coded. The signal will comprise perforations associated with the interponent solenoid circuits, i. e. Fig. 6 circuits, connected to function coder output wires 555A, 555C, 555D, 555G, 555H and 555J. As a further example, if the operator selects leading whereby brush 561 cooperates with contact 563, the signal for such leading will be generated through coder output wires 555A, 555C, 555E, 555G and 555I, for another point size, say 12 pt.

In the present machine, point size information and leading information will be coded on the tape preceding the signals for the line of characters to which the point size and leading information applies. This information will appear infrequently on the tape since it is not often that point size and leading vary. However, it does appear at the beginning of every tape. It is to be understood that, except at the start of every tape, point size information may be coded on the tape independent of leading information or leading information may be coded independent of point size information.

Figure 42:
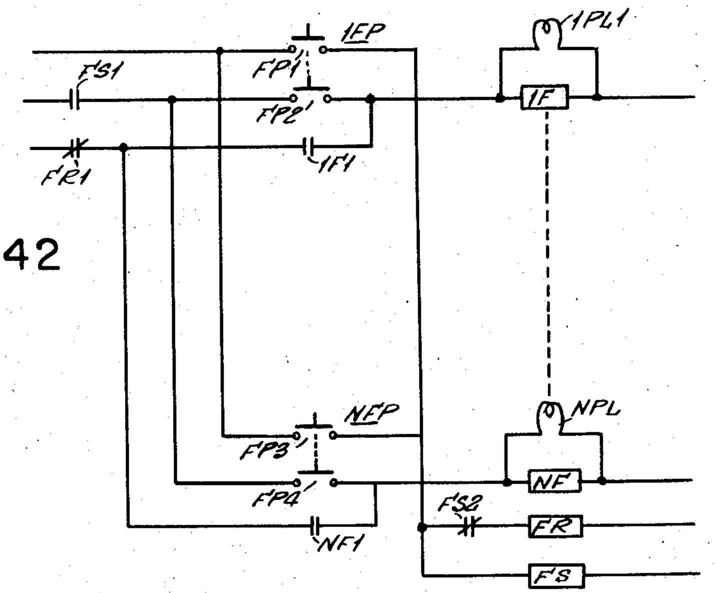
Fig. 42 is a schematic representation of the font selector circuit.

Referring to Fig. 42, there is shown a representative circuit for selecting one of a plurality of character fonts from which composition is effected in the photographic unit. By depressing any one of the font selection push buttons IFP . . . NFP, an appropriate signal, unique to the particular push button depressed, is coded on the control tape. When read or decoded in the photographic unit, the signal brings the selected font into photographing position so that composition of characters represented by the signals following the font signal will be effected from the selected font. In addition to controlling selection of the font which is photographed in the photographic unit, as by coding an appropriate signal on the control tape, the font selection circuit controls which one of the plurality of width decimal coder circuits 94A, 94B, etc., hereinabove described with reference to Fig. 1, is activated to total character widths.

As was above discussed, the keyboard unit of the present photocomposing machine acts to totalize the widths of the individual characters which go to make up a line of composition in order that justification, quad right or centering information may be obtained from the mechanism of the unit, coded on the control tape, and used to control composition in the photographic unit. Since it is desired that the present machine accommodate a wide variety of character fonts and since the unit widths of otherwise identical characters may vary from one font to another, the present machine incorporates mechanism whereby selection of a desired font from a large available number of fonts will also select a corresponding width coding mechanism for coding character widths. The selection is made automatically without the necessity of the machine operator manually changing code bars or the like.

The font selection push buttons IFP . . . NFP are provided on the auxiliary keyboard 549 and each comprises a double set of contacts. Considering the push button circuit for selection of the first font, the first set of push button contacts FPI complete a circuit for font reset relay coil FR through contacts FS2 and for font selection relay coil FS. The latter coil controls a switch which is time-delayed in operation, hence the switch controlled by coil FR will operate first to separate contacts FRI. The purpose of this is to deenergize any font selection circuit which may have been previously operated. For example, if, by a prior operation, pushbutton NFP had been depressed to select the font associated therewith, a self-holding circuit for coil NF would be completed through contacts FRI and NFI. Separation of contacts FRI, as now contemplated, will deenergize the circuit and thus prepare for selection of another font. Shortly after operation of the switch controlled by coil FR, the slow-in-operating switch controlled by coil FS operates to engage contacts FSI and FS3 and to separate contacts FS2. Separation of contacts FS2 deenergizes coil FR to restore contacts FR1 to their normally engaged condition. Contacts FS1 complete a circuit through push button contacts FP2, since the push button is still depressed, for the first font relay coil IF and the parallel connected pilot lamp IPL. This lamp is located adjacent the font push button IFP on the auxiliary keyboard and serves to visually signal the machine operator as to the font in use. Energization of coil IF results in the engagement of contacts IF1, IF2 . . . IF90 (assuming an eighty-eight character keyboard). Contacts IF1 complete a self-holding circuit for coil IF and pilot lamp IPL through contacts FR1. Thus, coil IF and lamp IPL remain energized while the machine is being operated and the first font is in use. If a second font were to be selected, contacts FR1 would separate to interrupt the circuit for coil IF and lamp IPL, as heretofore explained.

Figure 43:
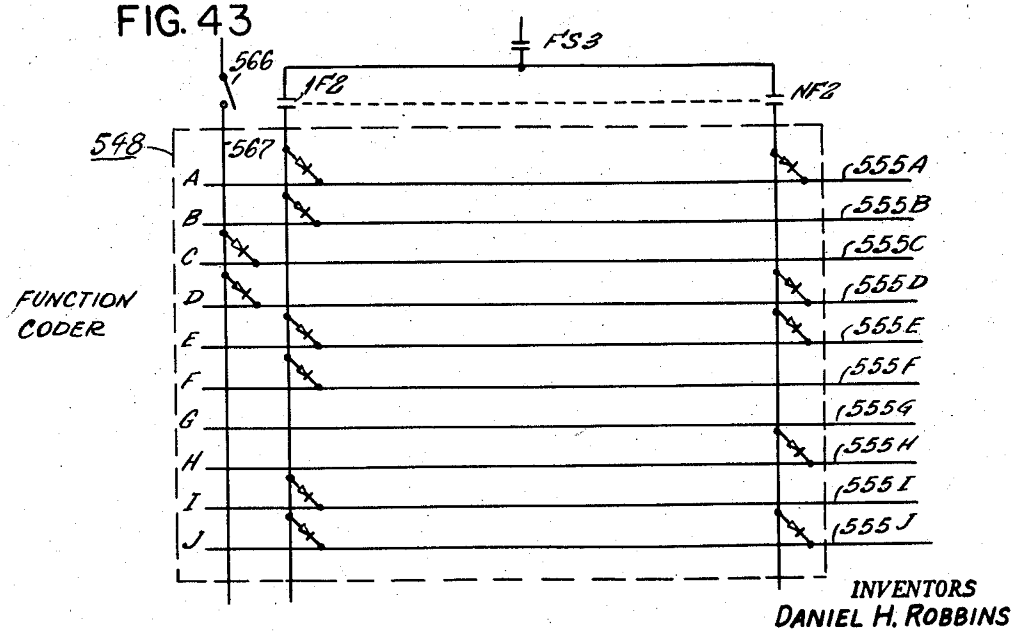
Fig. 43 is a schematic representation of another portion of the function coder.

Contacts IF2 and contacts FS3 complete a circuit for establishing the signal representative of the selected font in the function coder. It will be noted that the output wires of the coder 548 shown in Fig. 43 are designated the same as the output wires of Fig. 41, and they terminate in the same interponent solenoid circuits i. e. Fig. 6 circuits. The signal for the first font which was the one selected will comprise perforations made by operation of the interponent solenoids actuated through output wires 555A, 555B, 555E, 555F, 555I and 555J. Contacts IF3 . . . to IF90 complete circuits from the character keys to the width decimal coder circuits 94A associated with the selected font. In this manner, width information corresponding to the character font selected for photography will be coded on the control tape with the character identification portion of the overall character signal and will also be fed to the width totalizing circuits for the ultimate determination of justification, quad right or centering information.

If instead of depressing font push button IFP the operator had depressed push button NFP, circuitry would be established, in a manner similar to that explained above, for the coding of a font signal as by the energization of function coder output wires 555A, 555D, 555E, 555H and 555J. Also, in Fig. 1, the character width information would be transmitted through decimal coder 94B which corresponds to the selected font.

The arrangement disclosed has been found extremely suitable for accommodating a wide variety of character fonts having different type face styles in a photocomposing machine while at the same time eliminating the necessity for the machine operator to manually change width code mechanisms or foregoing the typographical aesthetics of varying the set widths of individual characters from one type face style to another.

The font selection signal, like the point size and leading signals, will appear on the control tape at the beginning thereof in order that photography of characters represented by signals following the introductory signals will be from a selected font. A font signal may also be interposed at any point within a line, as when it is desired to impart emphasis to text meaning by italicizing a word or words. Of course, the point size of a character from a new font, when located within a line, will be the same as that of the characters preceding or following it.

After the preliminary signals relating to point size, leading, and font selection have been coded on the control tape, the operator proceeds to keyboard the text material. If it is desired to indent, as in the first line of a paragraph, the operator will depress one of the width push buttons, e. g. 121B, either once or several times, depending on the amount of indentation desired, to code on the tape signals representative of width only. Thereafter, normal text composition is initiated. Each operation of a character key completes a circuit through the key operated switch, e. g. 50, and (assuming that the shift key was operated so that switch 53 is in the non-actuated position shown in Fig. 1), to conductor 60. The conductor is divided into two branches. One branch through conductor 62 leads to the character identification diode coder 63, wherein the single conductor is connected to a unique combination of output wires 64, 65, etc. through unidirectional current conducting devices. Each of the conductors leading from a character key is connected to a unique combination of coder output wires 64, 65, etc., so that each character will be identified by a signal peculiar to itself. The output wires lead through circuitry (Fig. 6, for example) to perforator interponent solenoids and therefore the control tape will be perforated to accord with the coder output wires energized as a result of depressing the character key.

If the shift key had not been operated, and the same character key depressed, the circuit would be traced through the other set of contacts, i. e. 51, of the double pole switch, actuated by the character key, to conductor 62A and thence to a unique combination of coder output wires. In the same manner, depressing any other character key will lead to the energization of a unique set of coder output wires, with the consequent perforation of a unique signal in the control tape for identification of the character represented by the character key.

Since character identification represents only one portion of the intelligence to be coded for a character, consideration now will be given to the coding of the character width information which is accomplished through conductor branch 92. The conductor leads to a plurality of decimal coders 94A, 94B, etc., each of which is associated with a character font, as heretofore described. Depending on which font has been selected through operation of a font selection push button, a set of font relay contacts 1F3 . . . 1F90 will connect one decimal coder to the conductors leading from the character key operated switches. In the example now being considered, font relay contacts 1F3 . . . 1F90 are engaged so that the circuit extends from the conductors to decimal coder 94A. If a different font selection push button had been depressed and other font relay contacts, e. g. contacts NF3 . . . NF90 engaged, the circuit would be to decimal coder 94B.

In the decimal coder, the conductor 92 is connected to an output wire which has an assigned value corresponding to the set width of the character represented by the character key. Other characters may have the same set width and the conductor leading from the switch actuated by the character key also will be connected to the same output wire. The output wire, e. g. 96, is then traced to the unit spacing circuit where, depending on whether or not a unit spacing push button (preferably located on the auxiliary keyboard) is depressed, the value of the set width of the character is coded at its normal unit value or with a plus or minus unit value.

Figure 45:
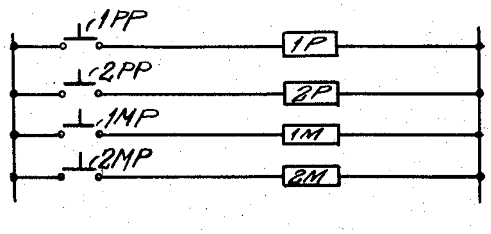
Fig. 45 is a schematic representation of the push button control circuit for the unit spacing circuit.

Referring to Figs. 45 and 5, the operator will depress push button 1PP to energize coil 1P and separate contacts 1P1, 1P3, 1P5, 1P6 and 1P8, and engage contacts 1P2, 1P4, 1P7 and 1P9, if it is desired to add one unit space to the coded width of a character, or will depress pushbutton 2PP to energize coil 2P and separate and engage the contacts shown in Fig. 5, if it is desired to add two unit spaces to the coded width of a character. It will be noted that with the circuit provided, if it is desired to add three unit spaces to the coded width of a character, it is only necessary to depress push buttons 1PP and 2PP. In a similar manner, push button 1MP may be depressed to energize coil 1M and subtract one unit space from the width of a character to be coded, or push button 2MP may be depressed to energize coil 2M and subtract two unit spaces from the width of a character to be coded. Also, by depressing push button 1MP and 2MP three unit spaces will be subtracted from the character width coded. Of course, the circuit arrangement disclosed can be extended to add or subtract additional unit spaces. From the output wire of the unit spacing circuit, the circuit for the particular character being considered passes to the binary width coder (Fig. 4), where the set width value of the character as modified, if at all, by the unit spacing circuit, is converted from decimal to binary form.

After translation to binary form, the width information is transmitted to the perforator, wherein each output wire from the binary width coder terminates in a Fig. 6 circuit to control the operation of an interponent solenoid and so control the coding of the width information for the character on the control tape adjacent that portion of the signal identifying the character. The binary width information is, in addition, transmitted to the justification and line remainder computer where the set widths of individual characters are totalized as heretofore described.

Figure 44:
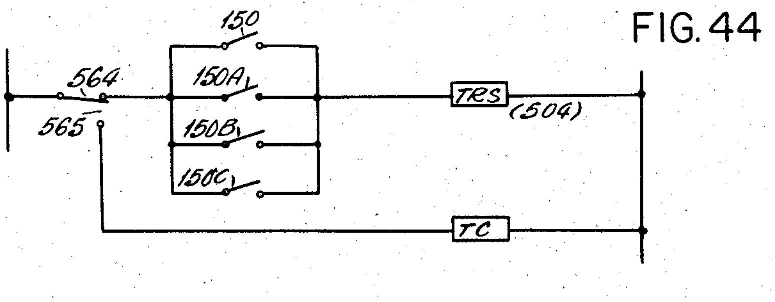
Fig. 44 is a schematic representation of the control cam shaft tripping switch circuit.

Operation of the binary solenoids or switch 274, either singly or in combination one with another, upon respect of width information from the binary width coder, results in the actuation of one or more of the parallel connected switches, e. g. 150 (Figs. 11 and 44) or e. g. switch 286 to complete a circuit for the cam shaft trip solenoid TRS in Fig. 44 (504 in Fig. 38) through the normally closed contacts 564 of a cam operated switch 522 (Fig. 7). Energization of the trip solenoid frees cam shaft 486 for one cycle of operations. During rotation of the cam shaft (which performs various timing functions not a part of the present invention as well as other functions hereinbefore disclosed), the drum 271 is actuated in accordance with the width information transmitted to the computer. Near the end of the cycle of operations, after the width information for the character being coded has been utilized in the computer (it being understood that a cycle of operation in the computer takes place for each bit of width information transmitted thereto), contacts 564 of switch 522 are separated to deenergize the trip solenoid and thereby set dog 495 in position to engage detent 494 and arrest rotation of the cam shaft. Contacts 565 engage to complete a circuit for thyration cut-off relay coil TC (Fig. 44) and separate contacts TC1. These contacts interrupt the plate circuits of the binary solenoid thyrations (Fig. 48) with the result that the tubes stop conducting and the interponent solenoids 90, 90A, 90B, etc. are deenergized. Having thus completed a single cycle of operations, the computer mechanism is prepared to receive the width information for subsequently keyboarded characters.

The operator will keyboard the entire line of text and each time a character key is depressed, a dual signal representing the character will be coded on the control tape, the signal comprising a character identification portion and a character width information portion. At the same time, the computer will be operated by the same character width information to totalize the set widths of the individual characters and subtract such total from the pre-set justified line length.

In addition to the characters which go to make up a line of text, there is also included within the line interword spaces which appear between the word groupings of characters. In keyboarding a line, each interword space is given a predetermined or normal value of set width, which value is transmitted to the computer, so that the width of the interword spaces are totalized with the widths of the characters. Therefore, the computer gives a true line remainder which takes into account the normal spacing between words. The line remainder thus obtained may be used with facility to provide any of the normal line composition controls. That is, for purposes of justification, the line remainder is divided among the number of interword spaces and the result of such division is added to each normal word space. For quadding right, the line remainder is simply counted off before actual composition of the line by photography takes place. For centering, the line remainder is divided in half, one half the remainder appearing at the beginning of a line while the other portion of the remainder appears at the end of the line.

Referring to Fig. 1 it is clear that actuation of the space key 566 completes three circuits, otherwise independent. In the first place, conductor 567 leads from the space key to the function coder 548, wherein a space signal is formed by the interconnection of conductor 567 with a unique combination of output wires, e. g. 555C and 555D. The function coder output wires transmit the space signal through interponent solenoid circuits to the perforator, where the signal is coded on the control tape. Secondly, the space key completes a circuit through conductor 570 to a Fig. 6 circuit, in the plate circuit of which is the carriage advance solenoid 322. Therefore, each energization of the space key results in the photocell carriage 303 being advanced one position in the manner more specifically described with reference to Fig. 23. In order to add the normal width value of a word space, a circuit is also completed to conductor 571 which leads to the binary width coder output wire and so provides a space width signl to the computer. If it is assumed that a normal word space has a width of four units, then conductor 571 can be directly connected to the Fig. 6 circuit which energizes the binary 4 solenoid (135) in the computer. Energization of the solenoid actuates the binary indexing mechanism and switch 150A for the tripping solenoid TRS (504) to inaugurate a computer cycle of operations to total the word space width with the character set widths.

It is thus seen that as the operator keyboards a line, a running count is maintained of the units-of-an-em values of the characters and word spaces in the line of text. The operation of the computer, in response to the introduction of the width information, results in the intermittent rotation of shaft 267, and through gears 433 and 434, of shaft 435 and cam 436. Each complete revolution of shaft 435, which takes place for each eighteen units of an em, or one em in an eighteen unit system, cam 436 co-acts with roller 572 to engage and separate contacts 437. These contacts are serially connected with solenoid 441 (Fig. 33) to energize and deenergize the solenoid so that, for each eighteen units of width information fed to the computer unit, shaft 365 is stepped one tenth of a revolution and the ems counter unit count wheel 384 subtracts one em from the previously indicated count. Rotation of shaft 365 also results in the movement of pointer carriage 420 toward the zero marker of linear em scale 426. As the carriage reaches the justification zone, switch 427 is actuated to complete a circuit and signal the operator by lamp 573 and buzzer 574 that the unit can give justification information and that, therefore, keyboarding of the line being composed can be halted.

Figure 46:
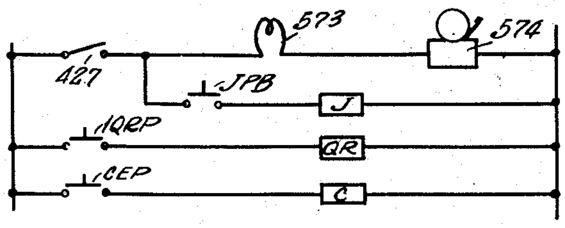
Fig. 46 is a schematic representation of the composition control circuit.
Figure 47:
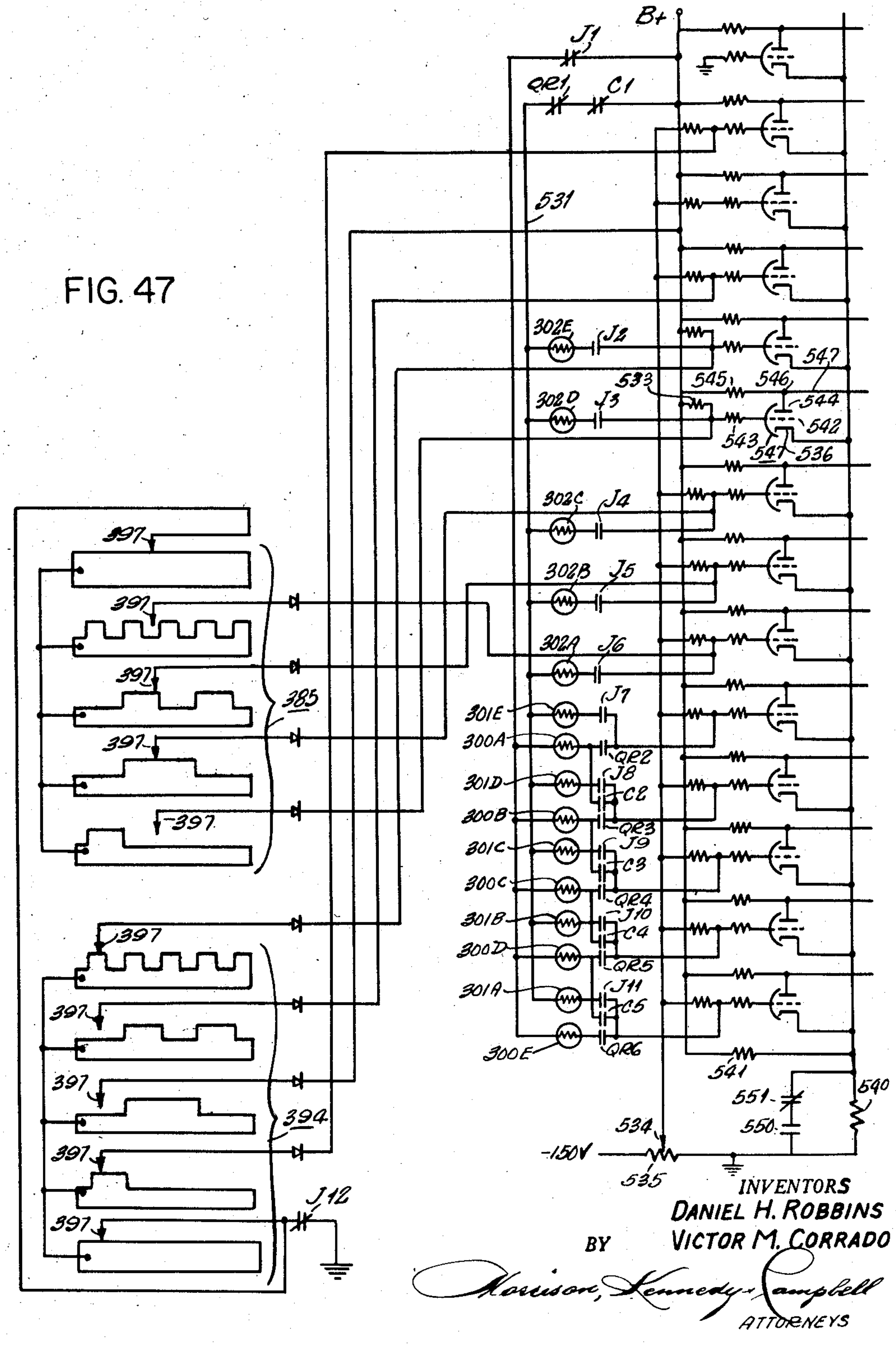
Fig. 47 is a schematic circuit diagram of the line remainder and justification read-out apparatus.

It will be assumed that composition of the line is halted and that, in being composed in the photographic unit, the line is to be justified. Hence the operator will depress the justification push button JPB located on the auxiliary keyboard to engage contacts and complete a circuit for the justification relay coil J (Fig. 46). Contacts J13 (Fig. 41) engage to complete a circuit to the function coder 548 and thereby code a justification signal on the control tape. Contacts J2 to J11 (Fig. 47) engage to complete the circuit to the photocell pick-ups 301A to 301E and 302A to 302E to thus read the justification information for the particular line being composed and code it on the tape immediately following the justification signal in the manner previously described. Contacts J1 separate to prevent the photocell tubes 300A to 300E, which read line remainder information, from conducting and coding such information on the control tape. For the same purpose contacts J13 separate to prevent a circuit being completed through the contact cylinders 385 and 394, which also code line remainder information.

If instead of depressing the justification push button, the operator depresses the quad right push button QRP (Fig. 46), also located on the auxiliary keyboard, and thereby engages contacts to complete a circuit for quad right relay coil QR, contacts QR7 (Fig. 41), which engage when the coil is energized, complete a circuit to the function coder and thus code a quad right signal on the control tape. The line remainder information, which is utilized in the photographic machine to compose the line in a quad right position, is obtained from the ems counter contact cylinders 385 and 394 which are shown in diagrammatic form in Fig. 47. A circuit, through contacts J12 and the contact disk segments, records the ems remainder in the line on the control tape. An additional circuit, through contacts J1 and photocells 300A to 300E, which co-act with the line remainder portion of drum 271, records the units-of-an-em remainder on the tape. Contacts QR1 separate to prevent a circuit being completed for photocells 301A to 301E and photocells 302A 302E, which photocells read justification information. In the photographic unit, the quad right signal, followed by the line remainder information, results in quad right composition of the line.

As another possibility, rather than depress the justification or quad right push buttons, the operator may depress the centering push button CEP (Fig. 46) which also is located on the auxiliary keyboard. In this instance, contacts engage to energize centering relay coil C and thereby engage contacts C6 (Fig. 41) to complete a circuit through the function coder and code a centering signal on the control tape. A circuit is completed through the ems counter contact cylinders segments to record the ems remainder on the control tape. However, since this information is to be used to cause a centering operation rather than a quad right operation in the photographic unit, the information will be read or decoded as if it were ens rather than ems. The distinction between ens and ems will be based on the signal which precedes the record information, that is, if the signal is a quad right signal the information will be read as ems and if it is a centering signal then the information will be read as ens.

Photocells 300A to 300E, which read line remainder and record this remainder in binary form for a quad right operation, are also activated when centering information is to be recorded. However, the value of the units line remainder is divided in half by the circuit shown in Fig. 47, wherein each photocell used for reading units remainder from drum 271 is connected through contacts C2 to C5 to the perforator interponent solenoid circuit normally associated with the next lower binary number. Thus, if photocell 300B is normally associated with the circuit having a binary value 8, it will, when used for centering, be associated with the circuit having a binary value 4 through contacts C3.

Of course, for quadding right and centering, switch 427 does not have to be actuated by the em indicator carriage 420. In fact, these operations can be carried out even after only a single character has been keyboarded for a line.

After the recordation of the desired end-of-line signal and the information associated therewith, coded information for succeeding lines can likewise be entered on the control strip. At the completion of keyboard composition, as at the end of a page or when it is desired to handle the previously coded information separately from any following coded information, the operator will depress an end-of-composition push button 575 (Fig. 41) located on auxiliary keyboard 549. The function of the push button is, first, to code and end-of-composition signal on the tape through function coder 548, and thereafter to advance the tape in the perforator unit so that that portion of it which has been coded may be severed from the remaining web. The end-of-composition signal will be read in the photographic unit to advance the sensitized film in its magazine, so that the portion of the film bearing the latent character images may be severed from the remainder of the film and thereafter processed.

Since, having described the invention, other arrangements for carrying out the invention may be suggested thereby, and many apparently widely different embodiments thereof could be made without departing from its scope, it is intended that all matter contained in the above description or shown in the accompanying drawings shall be interpreted as illustrative and not in a limiting sense.

What is claimed is:

1. In a machine for producing a coded tape representative of a composed line of type characters which vary in set width on a units-of-an-em basis, the combination with character keys for coding character signals on the tape and additional keys for coding function signals which control composition of coded characters, of line length apparatus comprising means for indicating line length, means for setting said indicating means to accord with a selected value of line length, means for actuating said indicating means in response to operation of a character key to subtract the set width of the character represented by the key from the pre-set line length and thereby indicate line remainder, a computer mechanism for computing and coding the line remainder information, and means controlled by said computer mechanism and responsive to operation of a function key for producing a corresponding line remainder signal on the tape.

2. In a machine for producing a coded tape representative of a composed line of type characters which vary in set width on a units-of-an-em basis, the combination with character keys for coding character signals on the tape and additional keys for coding function signals which control composition of coded characters, of line length apparatus comprising means for indicating line length in ems and units-of-an-em, means for setting said indicating means to accord with a selected value of line length, means for actuating said indicating means in response to operation of a character key to subtract the set width of the character represented by the key from the pre-set line length and thereby indicate line remainder, a computer mechanism for computing and coding the line remainder information, and means controlled by said computer mechanism and responsive to operation of a function key for producing a corresponding line remainder signal on the tape as ems and units of an em.

3. In a machine for producing a coded tape representative of a composed line of type characters which vary in set width on a units-of-an-em basis, the combination with character keys for coding character signals on the tape and additional keys for coding function signals which control composition of coded characters, of line length apparatus comprising means for indicating line length, said means including a digit wheel counter which indicates total ems as tens of ems and units of ems, means for setting said indicating means to accord with a selected value of line length, means for actuating the counter in response to operation of a character key to subtract the set width of the character represented by the key from the pre-set line length and thereby indicate line remainder, a computer mechanism for computing and coding the line remainder information, and means controlled by said computer mechanism and responsive to operation of a function key for producing a corresponding line remainder signal on the tape as tens of ems and units of ems.

4. The combination according to claim 1, wherein the function key also codes on the tape a signal representative of a quad right operation.

5. The combination according to claim 1, wherein the function key codes the line remainder on the tape as tens of ens and units of ens and also codes on the tape a signal representative of a centering operation.

6. The combination according to claim 1, wherein that part of the line remainder signal which represents the ems remainder is the same whether the composing operation part thereof is for quadding right or centering.

7. The combination according to claim 1, including a space key, and means for actuating said indicating means in response to the operation of said key to subtract the set width of the space represented by the key from the pre-set line length.

8. The combination according to claim 2, wherein the numerical value of the ems and units-of-an-em are indicated in binary form, and wherein the line remainder is coded on the tape in binary form.

9. The combination according to claim 2 including a space key, means responsive to operation of said space key for indicating the number of spaces in a line of composition, means for indicating when a composed line is within a predetermined measure of the pre-selected full line length, means having coded thereon justification information for combinations of line remainder within the predetermined measure of full line length and numbers of interword spaces, and means responsive to operation of a second function key after a line is composed to within the predetermined measure of full line length for coding justification information on the tape according to the line remainder and the number of word spaces in the line of composition.

10. The combination according to claim 9, wherein the coded justification information and the line length units-of-an-em information appear on a rotatable drum which is actuated in response to actuation of the character and space keys.

11. The combination according to claim 10, wherein the coded justification information and the line length units-of-an-em information are numerical values which are placed on the drum in binary form.

12. The combination according to claim 11, wherein the drum is in the form of a cylinder having opaque and translucent portions, the latter portions being the justification and line length units-of-an-em information, and including a light source for directing light through the translucent areas of the drum, and a plurality of light responsive elements located in a reference position with respect to said drum.

13. In a machine for producing a coded tape representative of a composed line of type characters which vary in set width on a units-of-an-em basis, the combination of means for setting the machine for the composition of a line of a predetermined length, means for totalizing the number of units comprised in said pre-set line, means responsive to key actuation during line composition for subtracting from the total the number of units represented by the set widths of the characters and spaces in the composed line and thereby computing the number of units in the line remainder, automatic means for coding the computed line remainder information, and signal producing mechanism actuated by said automatic coding means for producing on the tape a signal representative of the coded line remainder information.

14. The combination according to claim 13, wherein the line setting means include an em indicator as well as a units-of-an-em indicator.

15. The combination according to claim 13, wherein the totalizing means include an em indicator as well as a units-of-an-em indicator.

16. The combination according to claim 13, wherein the totalizing means include a digit wheel counter comprising a units-of-ems wheel and a tens-of-ems wheel.

17. The combination according to claim 16, wherein the totalizing means also include a units-of-an-em dial coupled to the counter.

18. The combination according to claim 13, wherein the subtracting means are operated by an indexing device under binary code control.

19. The combination according to claim 13, wherein the line remainder information is coded in ems and units of an em.

20. The combination according to claim 13, wherein the coding means include a rotary drum responsive to key actuation and having code elements arranged thereon in column and row formation to produce a line remainder signal representing units of an em.

21. The combination according to claim 13, wherein the totalizing means include a digit wheel counter comprising a units-of-ems wheel and a tens-of-ems wheel, and wherein the coding means include coded cylinders connected to and operated with said wheels to produce a line remainder signal representing corresponding decimal values.

22. The combination according to claim 13, wherein the line setting means include a manually rotatable knob, an em scale pointer connected to and operated by said knob, and a units-of-an-em dial also connected to and operated by said knob.

23. The combination according to claim 22, wherein the totalizing means are also connected to and operated by said rotatable knob so as to add and register the total number of units for which the line is set.

24. The combination according to claim 22, wherein the em scale pointer, during line composition, is connected to and operated by the subtracting means so as to indicate at all times the number of ems in the line remainder.

25. The combination according to claim 15, wherein the em indicator, as well as the units-of-an-em indicator, during line composition, are connected to and operated by the subtracting means so as to indicate at all times the exact number of units in the line remainder.

26. The combination according to claim 13, wherein the coding means are controlled by a quad right key which produces a signal in the tape representing a blank composing operation at the leading end of the line equal to the full number of units in the line remainder.

27. The combination according to claim 13, wherein the coding means are controlled by a centering key which produces a signal in the tape representing a blank composing operation at each end of the line equal to one-half the full number of units in the line remainder.

28. The combination according to claim 26, wherein the quad right key, when actuated at the end of the line, controls two electric circuits, one leading through a function coder which produces a quad right signal on the tape, and the other through a computer circuit which produces a line remainder signal in terms of ems on the tape.

29. The combination according to claim 27, wherein the centering key, when actuated at the end of the line, controls two electric circuits, one leading through a function coder which produces a centering signal on the tape, and the other through a computer circuit which produces a line remainder signal in terms of ens on the tape.

30. In a machine for producing a coded tape having a succession of code signals thereon representative of a justified composed line of type characters which vary in set widths on a unit basis, the combination of a keyboard comprising a series of character keys and a word space key, a rotary justification information computer drum, means acting in response to the actuation of the keys for rotating the drum different unit distances in accordance with unit variations in set widths of the type characters and word spaces being composed, said drum having a series of rows of light transmitting code elements spaced apart in a circumferential direction on a unit basis and also having a series of columns of light transmitting code elements spaced apart in an axial direction on a word space basis, the code elements in row formation being arranged in a plurality of groups having different quotient values as between the groups and corresponding in number in the respective groups to the number of units which may remain in an unjustified line, and the code elements in column formation being arranged in a plurality of groups and having different quotient remainder values as between the groups and corresponding in number to the number of word spaces which may occur in a composed line, decoding mechanism cooperating with the computer drum and presenting as many photocell code reading elements as there are different groups of light transmitting code elements on the drum, a movable carriage on which the photocell code reading elements are mounted and which is movable axially of the computer drum, means responsive to each actuation of the word space key for effecting movement of the carriage for a distance of one column, means operable after the composition of a line for activating the photocell code reading elements located at the time in cooperative relation to the active light transmitting code elements on the drum as determined by the group, row and column arrangement of said code elements, and electrically controlled signal producing mechanism acting in response to the photocell code reading elements to produce corresponding justification signals in the coded tape.

31. In a machine for producing a coded tape having a succession of code signals thereon representative of a composed line of type characters which vary in set width on a units-of-an-em basis, the combination of a keyboard comprising a series of character keys and a word space key, means for setting the machine for the composition of a line of predetermined length, and a line remainder information computer mechanism responsive to the actuation of said keys for totalizing the number of units represented by the combined widths of characters and word spaces in a composed line and then subtracting said total from the total number of units comprised in the pre-set line so as thereby to compute the number of units in the line remainder, said computer mechanism including a rotary drum having code elements arranged thereon in column and row formation to produce a line remainder signal representing units of an em, together with signal producing mechanism responsive to the code elements of the rotary drum to produce a units-of-an-em line remainder signal in the coded tape.

32. The combination according to claim 31, wherein the code elements are light transmitting, and wherein the signal producing mechanism is electrically controlled and is responsive to said light transmitting code elements.

33. The combination according to claim 31, wherein the code elements on the rotary drum are light transmitting, and including code reading elements cooperating with the drum and in the form of photocells activated by the active light transmitting code elements.

34. The combination according to claim 31, including a digit wheel counter comprising a units-of-ems wheel and a tens-of-ems wheel, said wheels having coded cylinders operated thereby and functioning to produce line remainder signals representing units of ems and tens of ems, respectively.

35. The combination according to claim 30, wherein the rotary drum is also formed with light transmitting code elements arranged thereon to produce a line remainder signal representing units of an em.

36. In a machine for producing a coded tape representative of a composed line of type characters which vary in set width on a units-of-an-em basis, the combination of a keyboard, a character identification code mechanism acting in response to key actuation for producing character identification signals in the tape, and a character width code mechanism acting in response to the same key actuation for producing corresponding character width signals in the tape, said character width code mechanism including a plurality of groups of code elements having different character width values as between groups, the different groups of character width code elements representing different type fonts and the code elements in each group representing the set width values of the type characters in the corresponding font, together with means for selecting one or another of the groups of character width code elements according to the font of type characters to be composed.

37. The combination according to claim 36, wherein the selecting means include a function key which produces in the tape a signal representing the group of character width code elements selected.

38. The combination according to claim 37, wherein the function key is a font selecting key which produces in the tape a font signal representing the group of character width code elements selected.

39. The combination according to claim 36, wherein the character width code elements in each of the different groups represent in decimal form the unit width values of the type characters in the corresponding group, and wherein the character width code mechanism also includes a further group of code elements for converting into binary form the decimal unit width values of the type characters of the selected group, said group of binary code elements being common to all of the groups of decimal code elements.

40. The combination according to claim 36, wherein the character width code elements in each of the different groups represent in decimal form the unit width values of the type characters in the corresponding group, and wherein the character width code mechanism also includes means for varying the decimal unit values of the code elements of the selected group, said unit varying means being common to all of the groups of decimal code elements.

41. The combination according to claim 39, wherein the character width code mechanism also includes means for varying the decimal unit values of the code elements of the selected group, said unit varying means being common to all of the groups of the decimal code elements and connected to the appropriate binary code elements of the converting group.

42. The combination according to claim 36, wherein all of the code elements therein referred to are in the form of electric conductors which control the operation of the signal producing mechanism according to code.

43. In a machine for producing a coded tape representative of a composed line of type characters which vary in set width on a units-of-an-em basis, the combination of a keyboard, a character identification code mechanism acting in response to key actuation for producing character identification signals in the tape, and a character width code mechanism acting in response to the same key actuation for producing corresponding character width signals in the tape, said character width code mechanism comprising a group of code elements representing in decimal form the unit set width values of the type characters, and a further group of code elements for converting into binary form the decimal unit width values of the type characters.

44. In a machine for producing a coded tape representative of a composed line of type characters which vary in set width on a units-of-an-em basis, the combination of a keyboard, a character identification code mechanism acting in response to key actuation for producing character identification signals in the tape, and a character width code mechanism acting in response to the same key actuation for producing corresponding character width signals in the tape, said character width code mechanism comprising a group of code elements representing in decimal form the unit set width values of the type characters, and means for varying the decimal unit values of the code elements to increase or decrease by one or more units the normal character width value of any selected character.

45. In a machine for producing a coded tape representative of a composed line of type characters which vary in set width on a units-of-an-em basis, the combination of a keyboard, a character identification code mechanism acting in response to key actuation for producing character identification signals in the tape, and a character width code mechanism acting in response to the same key actuation for producing corresponding character width signals in the tape, said character width code mechanism comprising a group of code elements representing in decimal form the unit set width values of the type characters, and means for varying the decimal unit values of the code elements to increase or decrease by one or more units the normal character width value of any selected character, said unit varying means including plus and minus keys which are actuated in advance of the character keys.

46. The combination according to claim 43, including means for varying the decimal unit values of the code elements to increase or decrease by one or more units the normal character width value of any selected character, said unit varying means being connected to the appropriate binary code elements of the converting group.

47. In a machine for producing a coded tape representative of a composed line of type characters which vary in set width on a units-of-an-em basis, the combination of a keyboard, a character identification code mechanism acting in response to key actuation for producing character identification signals in the tape, and a character width code mechanism acting in response to the same key actuation for producing corresponding character width signals in the tape, said character width code mechanism comprising a decimal unit coder connected to the finger keys, a unit spacing device connected to the decimal unit coder, and a binary width coder connected to the unit spacing device and controlling the operation of the signal producing mechanism.

48. The combination according to claim 47, including an auxiliary keyboard connected to the binary width coder for producing lone width signals in the tape.

49. The combination according to claim 43, wherein all of the code elements therein referred to are in the form of electrical conductors which control the operation of the signal producing mechanism according to code.

50. In a machine for producing a coded tape representative of a composed line of type characters which vary in set width on a units-of-an-em basis, the combination of a keyboard, a character identification code mechanism acting in response to key actuation for producing character identification signals in the tape, a character width code mechanism acting in response to the same key actuation for producing corresponding character width signals in the tape, a justification information computer mechanism, and means also responsive to the same key actuation for operating the computer mechanism step by step in totalizing the number of units represented by the combined widths of the characters and word spaces in the unjustified line, said operating means including a first indexing device comprising a series of index members representing in decimal form and by even numbers unit character width values, and a second indexing device for increasing by one the unit decimal value of any one of the even decimal values represented by the first indexing device.

51. The combination according to claim 50, wherein the selection of the index members of the first indexing device is controlled by a binary code system.

52. The combination according to claim 51, wherein the second indexing device has the binary value of one and forms part of the binary code system for the first indexing device.

53. The combination according to claim 50, wherein the justification information computer mechanism comprises a rotary drum with signal producing code elements arranged thereon, and wherein the drum is rotated by the two indexing devices different unit width distances according to the varying character width values.

54. The combination according to claim 53, wherein the two indexing devices rotate the justification drum through a differential gear set, one part of which is connected to the first indexing device, and the other part of which is connected to the second indexing device.

55. The combination according to claim 50, wherein the two indexing devices are controlled by the character width code mechanism which produces character width signals in the tape.

56. The combination according to claim 55, wherein the character width information is transmitted in binary form both to the character width signal producing mechanism and the justification information computer mechanism.

57. In a machine for producing a coded tape representative of a composed line of type characters which vary in set width on a units-of-an-em basis, the combination of a keyboard, a character identification code mechanism acting in response to key actuation for producing character identification signals in the tape, a character width code mechanism acting in response to the same key actuation for producing corresponding character width signals in the tape, a function coder acting in response to a function-key actuation for producing in the tape any selected one of a plurality of signals representative of different point sizes, and means for setting the coder according to the point size selected.

58. In a machine for producing a coded tape representative of a composed line of type characters which vary in set width on a units-of-an-em basis, the combination of a keyboard, a character identification code mechanism acting in response to key actuation for producing character identification signals in the tape, a character width code mechanism acting in response to the same key actuation for producing corresponding character width signals in the tape, a function coder acting in response to a function-key actuation for producing in the tape any selected one of a plurality of signals representative of different point size leading, and means for setting the coder according to the point size leading selected.

59. In a machine for producing a coded tape having a succession of code signals thereon representative of a composed line of type characters which vary in set width on a units-of-an-em basis, the combination of a keyboard comprising a series of character keys and a word space key, means for setting the machine for the composition of a line of predetermined length, and a line remainder information computer mechanism responsive to the actuation of said keys for totalizing the number of units represented by the combined widths of characters and word spaces in a composed line and then subtracting said total from the total number of units comprised in the preset line so as to thereby to compute the number of units in the line remainder, said computer mechanism having code elements representative of the computed number of units comprising the line remainder, together with signal producing mechanism responsive to the code elements of the computer mechanism to produce a corresponding line remainder signal in the coded tape.

60. In a machine for producing a coded tape representative of a composed line of type characters which vary in set width on a units-of-an-em basis, the combination of a keyboard, a character identification code mechanism acting in response to key actuation for producing character identification signals in the tape, an automatic computer mechanism acting in response to the same key actuation for computing the total number of units represented by the set widths of the characters and spaces in the composed line, and an indicator mechanism actuated by said automatic computer mechanism to indicate the length of the composed line, said automatic computer mechanism including a plurality of groups of code elements having different character width values as between groups, the different groups of character width code elements representing different type fonts and the code elements in each group representing the set width values of the type characters in the corresponding font, and means for selecting one or another of the groups of character width code elements according to the font of type characters to be composed.

61. The combination according to claim 60, wherein the character width code elements in each of the different groups represent in decimal form the unit width values of the type characters in the corresponding group, and wherein the automatic computer mechanism also includes a further group of code elements for converting into binary form the decimal unit width values of the type characters of the selected group, said group of binary code elements being common to all of the groups of decimal code elements.

62. The combination according to claim 60, wherein the character width code elements in each of the different groups represent in decimal form the unit width values of the type characters in the corresponding group, and wherein the automatic computer mechanism also includes means for varying the decimal unit values of the code elements of the selected group, said unit varying means being common to all of the groups of decimal code elements.

63. The combination according to claim 61, wherein the automatic computer mechanism also includes means for varying the decimal unit values of the code elements of the selected group, said unit varying means being common to all of the groups of the decimal code elements and connected to the appropriate binary code elements of the converting group.

References Cited in the file of this patent

UNITED STATES PATENTS

| | | |
|---|---|---|
| 536,149 | Johnson | Mar. 19, 1895 |
| 944,405 | Bancroft et al. | Dec. 28, 1909 |
| 1,094,629 | Bancroft | Apr. 28, 1914 |
| 1,136,080 | Cornwall | Apr. 20, 1915 |
| 2,024,006 | Krum | Dec. 10, 1935 |
| 2,179,493 | Cook | Nov. 14, 1939 |
| 2,285,206 | Indahl | June 2, 1942 |
| 2,484,649 | Root | Oct. 11, 1949 |
| 2,609,907 | Lynch | Sept. 9, 1952 |
| 2,641,522 | King | June 9, 1953 |
| 2,762,485 | Bafour et al. | Sept. 11, 1956 |

FOREIGN PATENTS

| | | |
|---|---|---|
| 1,121,997 | France | Aug. 29, 1956 |